United States Patent
Takamori et al.

(10) Patent No.: US 7,478,972 B2
(45) Date of Patent: Jan. 20, 2009

(54) ROTATION SUPPORTING MECHANISM AND PORTABLE TERMINAL

(75) Inventors: Satoshi Takamori, Kyoto (JP); Tsuyoshi Uchida, Kyoto (JP); Masami Nishida, Osaka (JP)

(73) Assignees: OMRON Corporation, Kyoto (JP); Sony Ericsson Mobile Communications Japan, Inc., Tokyo (JP)

( * ) Notice: Subject to any disclaimer, the term of this patent is extended or adjusted under 35 U.S.C. 154(b) by 311 days.

(21) Appl. No.: 10/534,436

(22) PCT Filed: Sep. 10, 2004

(86) PCT No.: PCT/JP2004/013224

§ 371 (c)(1),
(2), (4) Date: Dec. 13, 2005

(87) PCT Pub. No.: WO2005/026562

PCT Pub. Date: Mar. 24, 2005

(65) Prior Publication Data

US 2006/0098813 A1     May 11, 2006

(30) Foreign Application Priority Data

Sep. 12, 2003  (JP) ............................. 2003-321478
Jun. 9, 2004   (JP) ............................. 2004-171294

(51) Int. Cl.
    *F16C 11/00*   (2006.01)
(52) U.S. Cl. .................... 403/409.1; 403/113; 403/117; 403/120; 403/93; 403/96; 248/292.13; 455/575.3; 455/575.4

(58) Field of Classification Search ............. 403/409.1, 403/103, 113, 117, 120, 162, 71, 78, 85, 403/92, 93, 96; 248/291.1, 292.13; 455/575.1, 455/575.3, 575.4
See application file for complete search history.

(56) References Cited

U.S. PATENT DOCUMENTS 3,583,734 A * 6/1971 Magi ........................ 403/96

(Continued)

FOREIGN PATENT DOCUMENTS

JP          4-130685         11/1992

(Continued)

OTHER PUBLICATIONS

English Patent Abstract of JP2004023469 from esp@cenet, published Jan. 22, 2004, 1 page.

(Continued)

*Primary Examiner*—Michael P Ferguson
(74) *Attorney, Agent, or Firm*—Osha•Lian LLP

(57) ABSTRACT

A rotational supporting mechanism, which supports a main body and a cover, includes an eccentric cam. The main body and the cover are superposed in a closed position. From the closed position, the cover is rotated 180 degrees and stopped at a 180-degree rotational position in an open position. The eccentric cam rotates eccentrically. The pressing means presses a cam surface of the eccentric cam in a direction of a line connecting a portion of the eccentric cam corresponding to the closed position and a portion of the eccentric cam corresponding to the open position when the main body and the cover are superposed in the closed position. Rotation of the cam is stopped in the open position and the closed position.

15 Claims, 27 Drawing Sheets

U.S. PATENT DOCUMENTS

| | | | | |
|---|---|---|---|---|
| 5,485,517 A | * | 1/1996 | Gray | 379/433.13 |
| 6,856,792 B2 | * | 2/2005 | Harmon | 455/575.3 |
| 7,142,667 B2 | * | 11/2006 | Harmon et al. | 455/575.3 |
| 7,231,188 B2 | * | 6/2007 | Godston et al. | 455/575.1 |

FOREIGN PATENT DOCUMENTS

| | | |
|---|---|---|
| JP | 2000-97227 | 4/2000 |
| JP | 2003-28138 | 1/2003 |
| JP | 2003-107314 | 4/2003 |
| JP | 2003-239942 | 8/2003 |
| JP | 2004-23469 | 1/2004 |
| JP | 2004-108581 | 4/2004 |

OTHER PUBLICATIONS

English Patent Abstract of JP2004108581 from esp@cenet, published Apr. 8, 2004, 1 page.

English Patent Abstract of JP2003239942 from esp@cenet, published Aug. 27, 2003, 1 page.

English Patent Abstract of JP2000097227 from esp@cenet, published Apr. 4, 2000, 1 page.

Partial English Translation of Japanese Publication No. JP-U1-4-130685, published Nov. 30, 1992, 2 pages.

English Patent Abstract of JP2003107314 from esp@cenet, published Apr. 9, 2003, 1 page.

* cited by examiner

Fig. 4
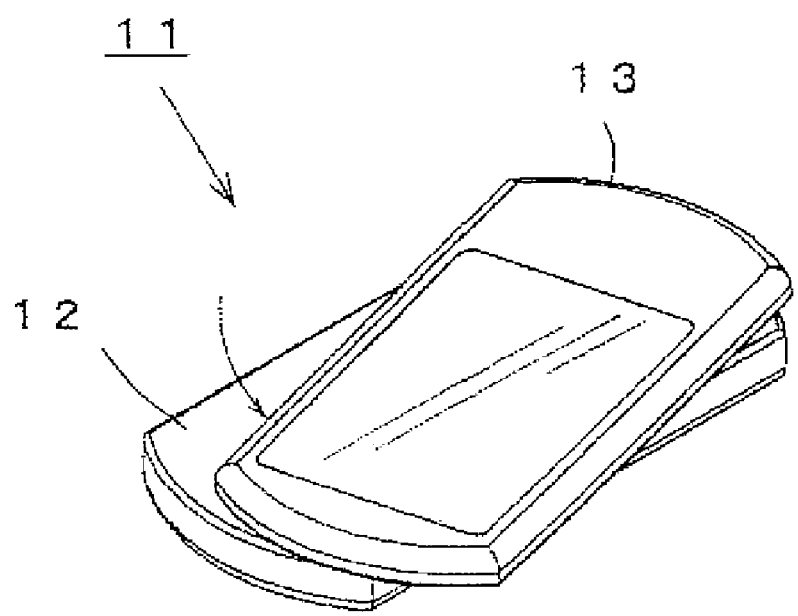
(A)
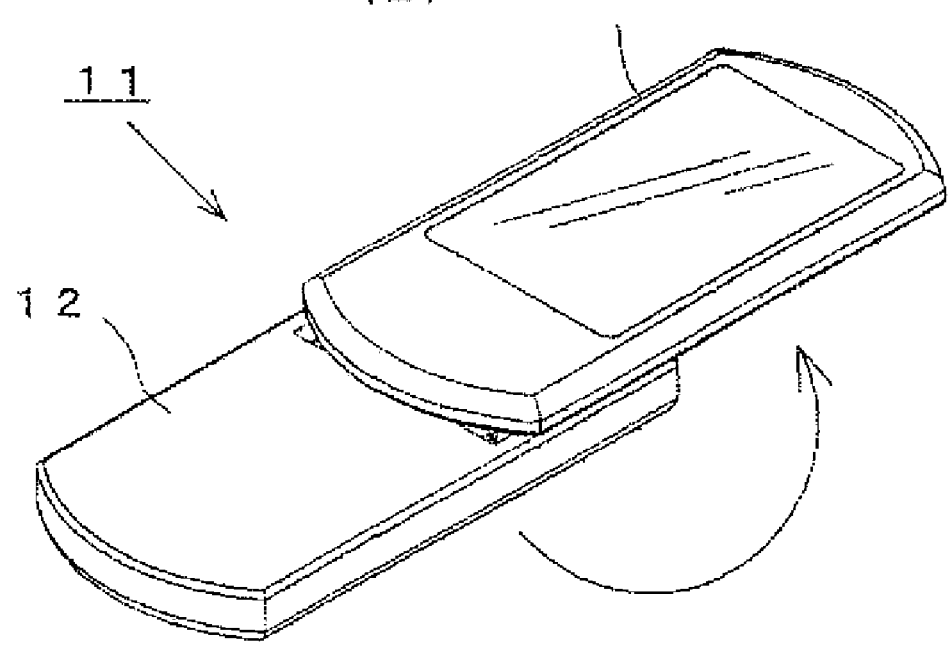
(B)

Fig. 8
(A)
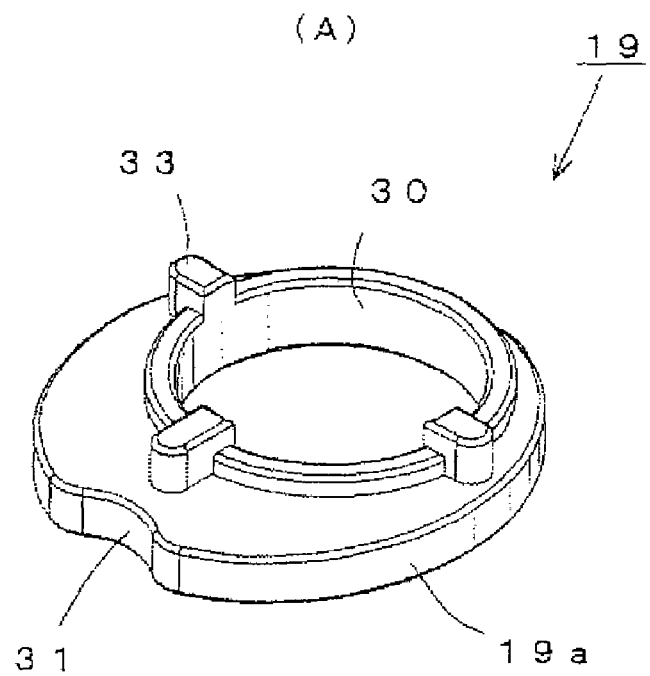
(B)
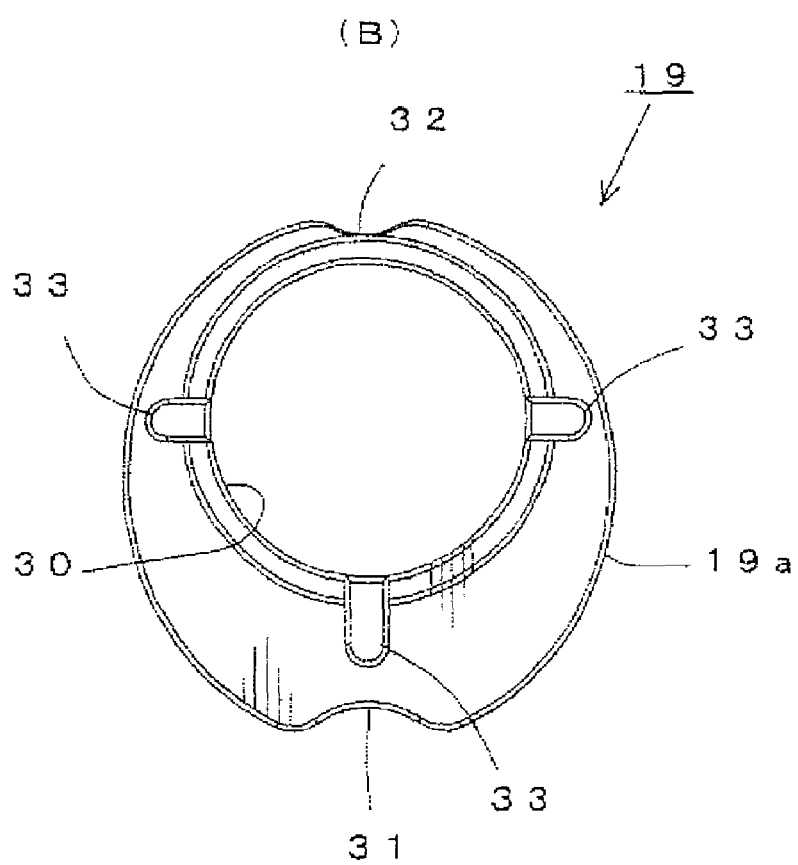

Fig. 9
(A)
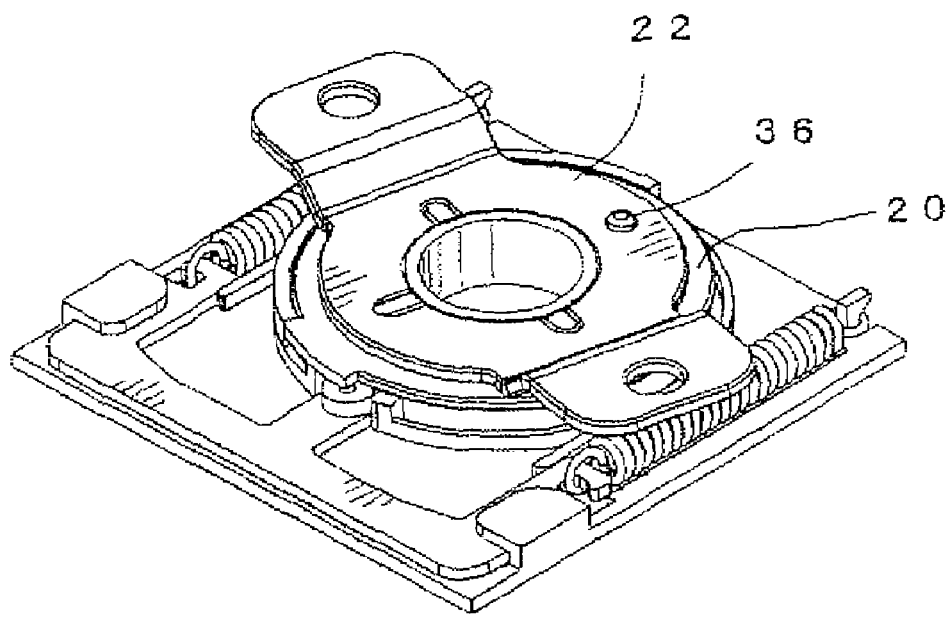
(B)
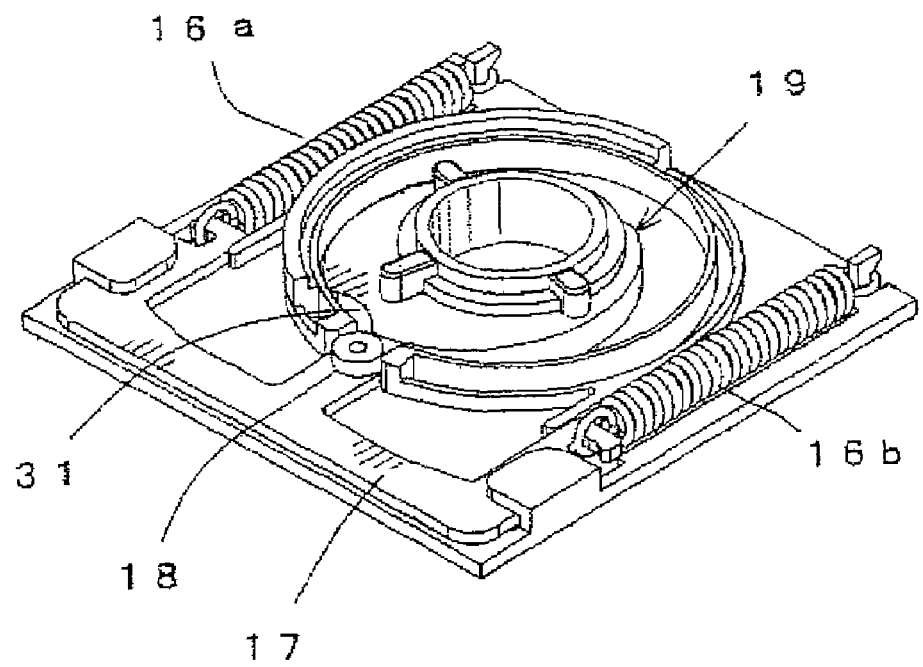

Fig. 10
(A)
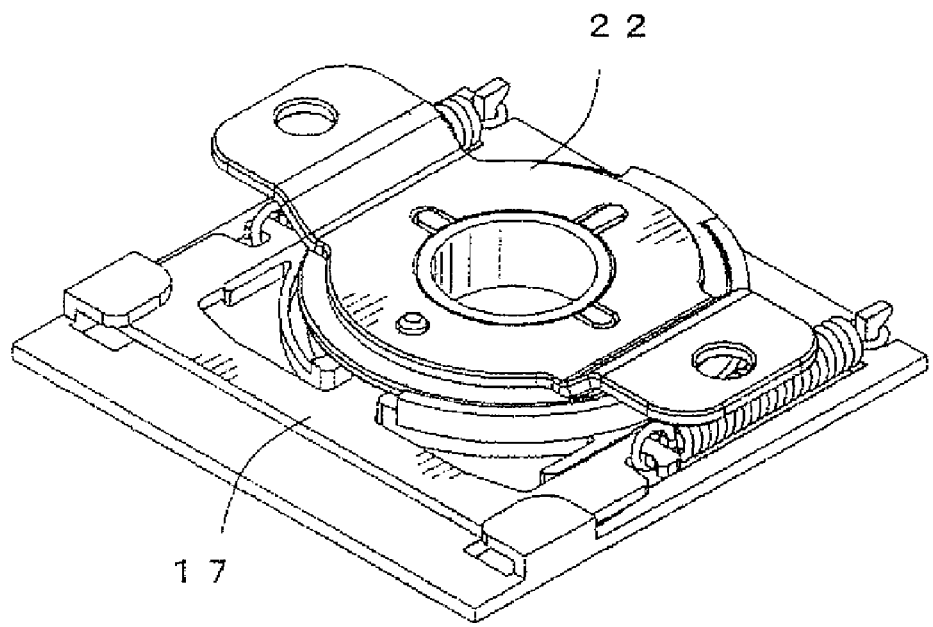
(B)
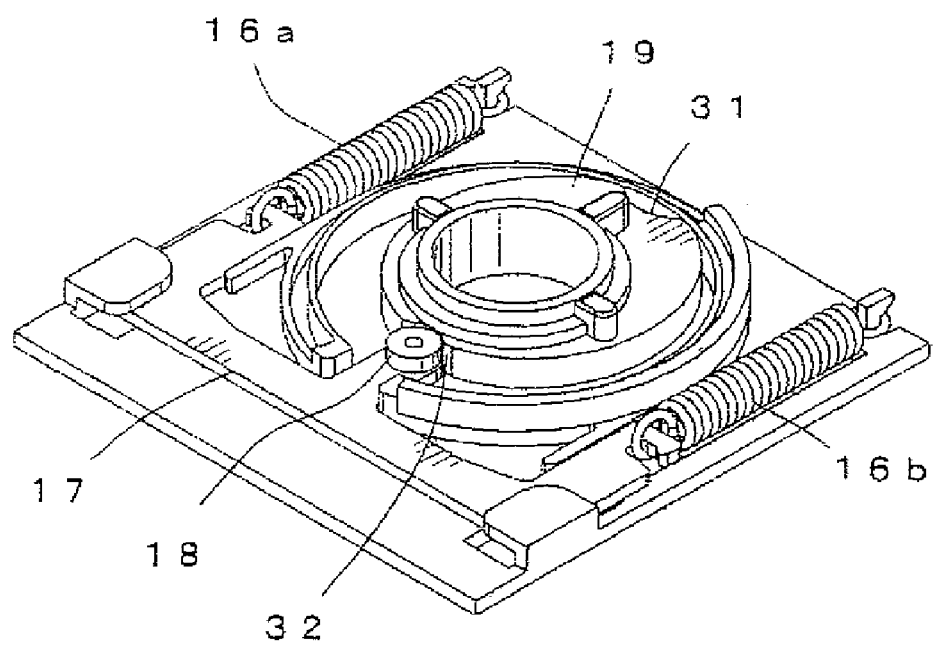

Fig. 11
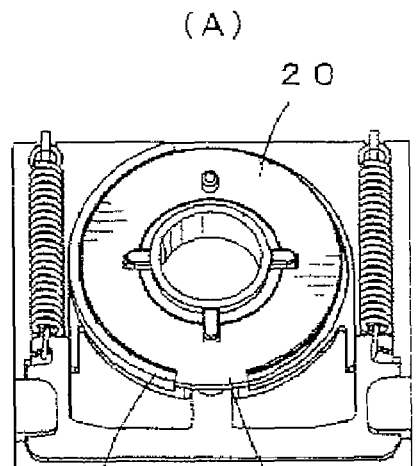
(A)
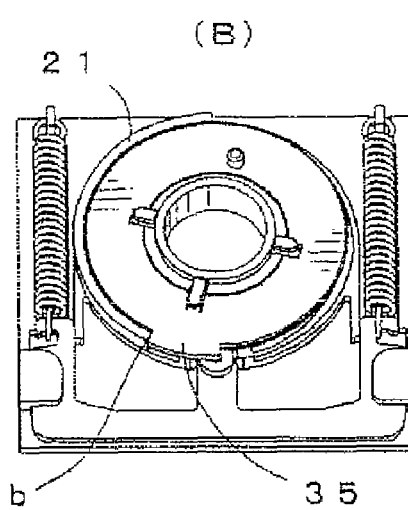
(B)
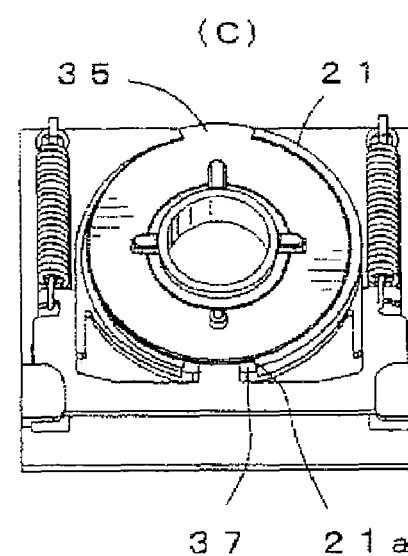
(C)

Fig. 13
(A)
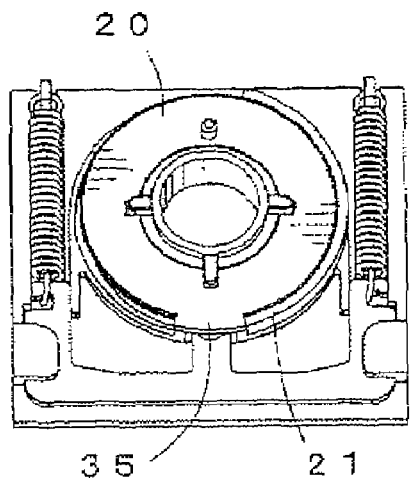
(B)
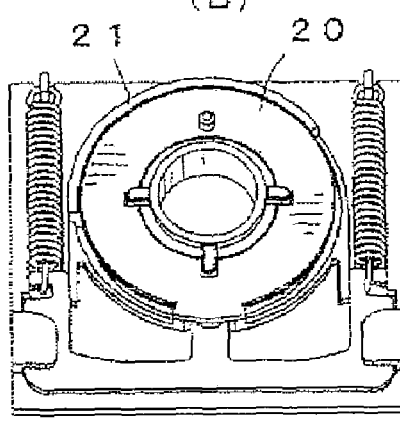
(C)
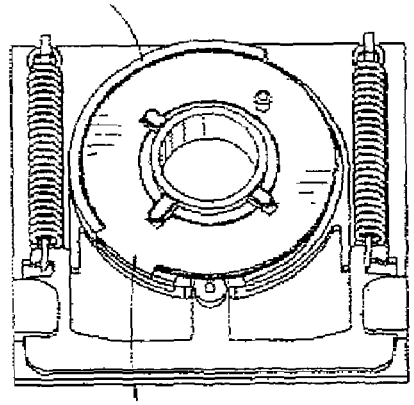

Fig. 19
(A)
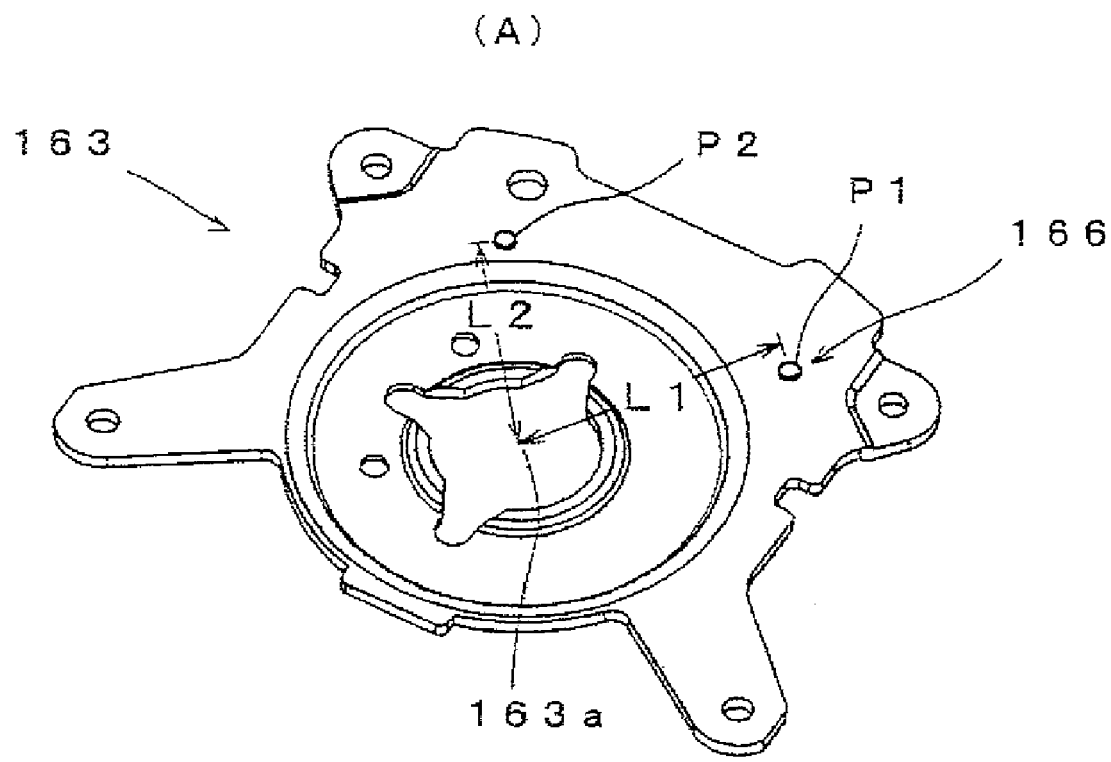
(B)
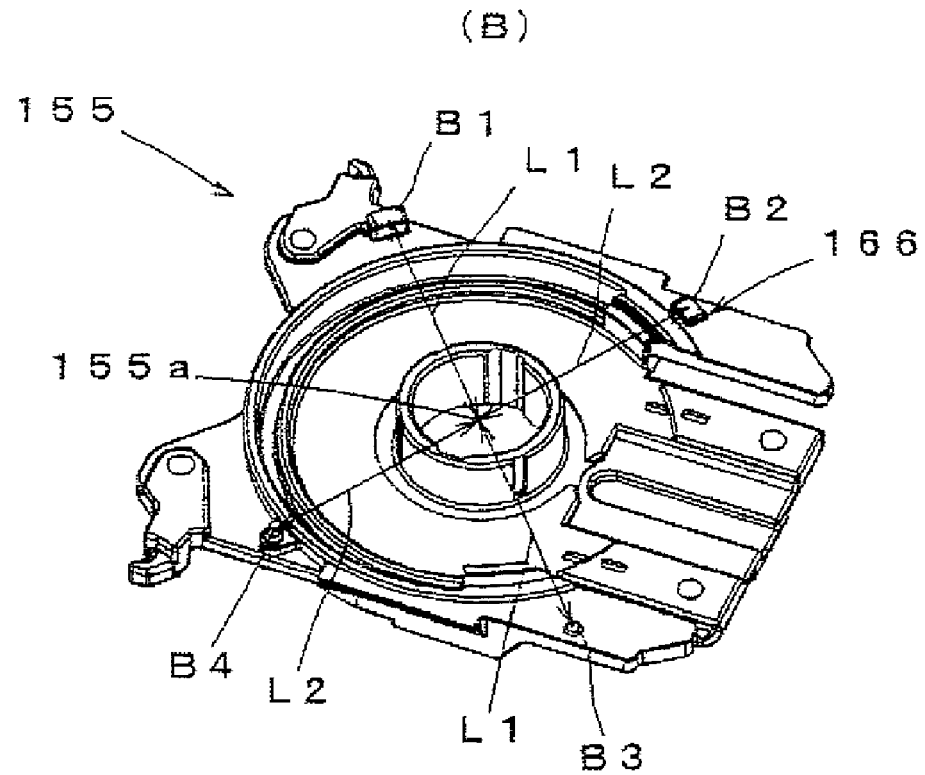

Fig. 22
(A)
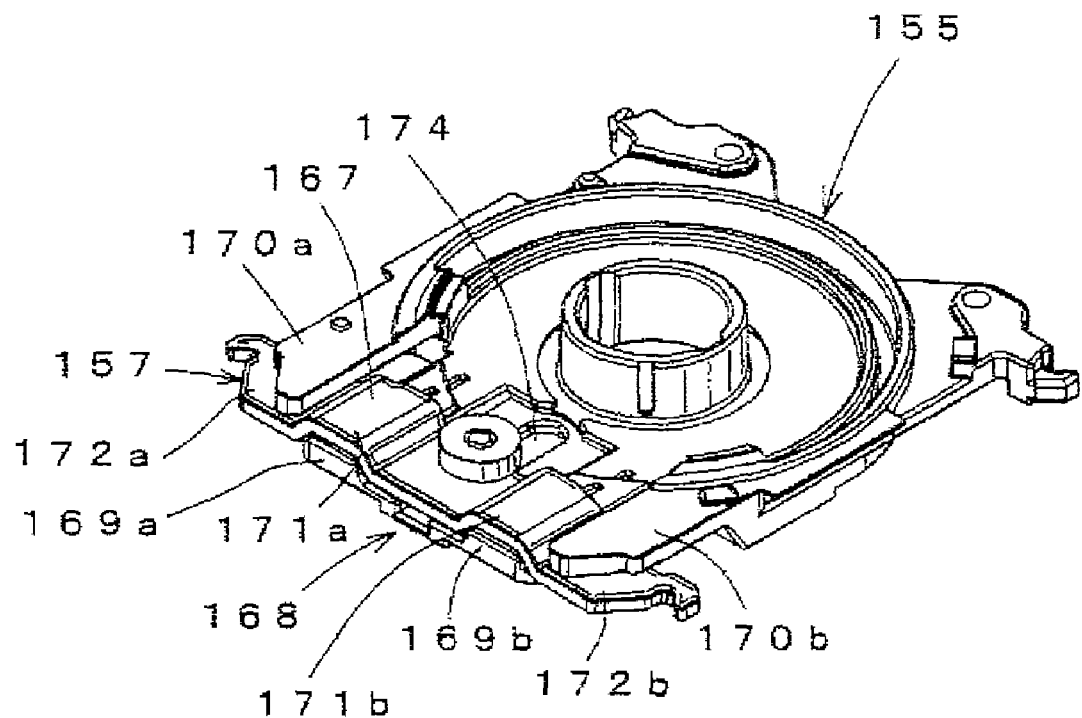
(B)
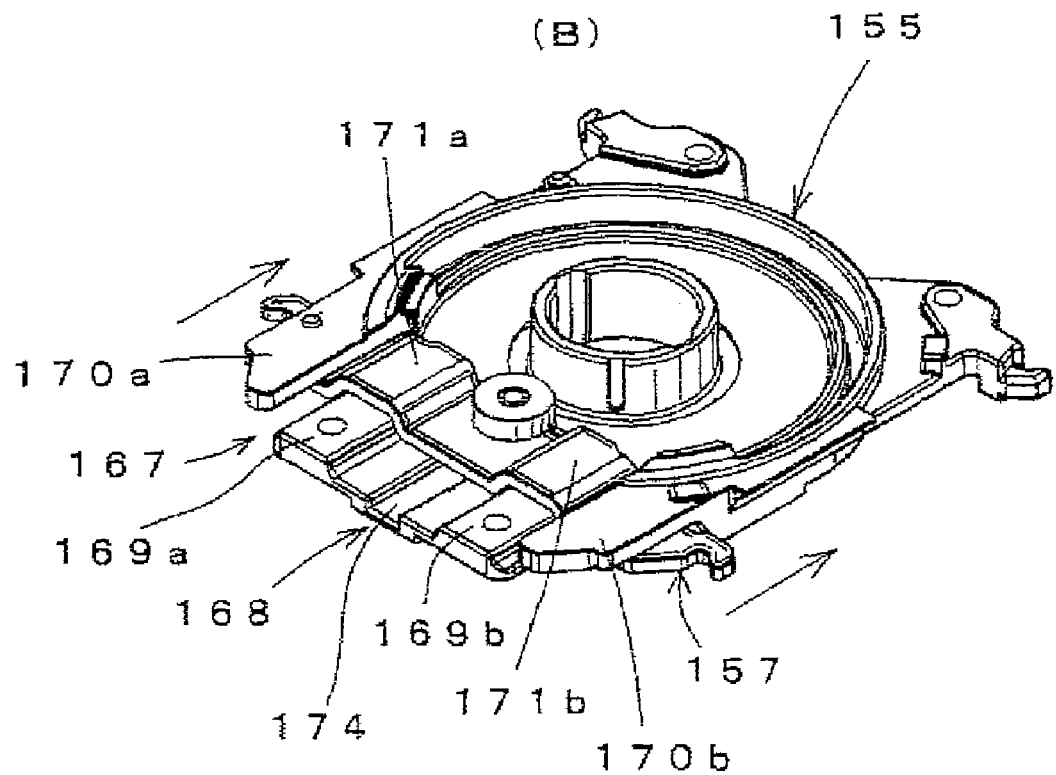

Fig. 23
(A)
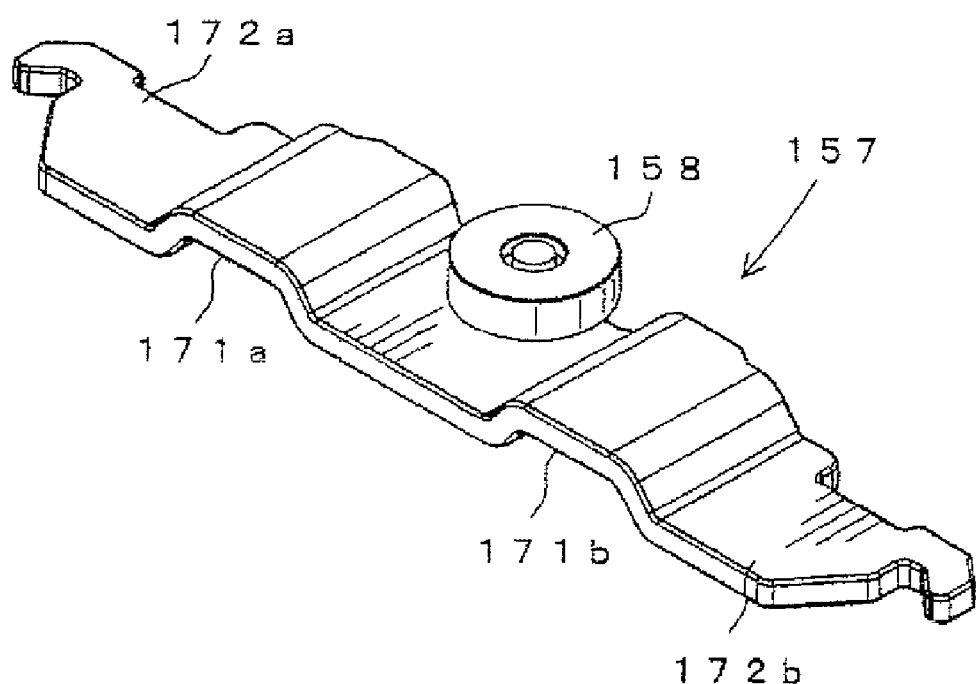
(B)
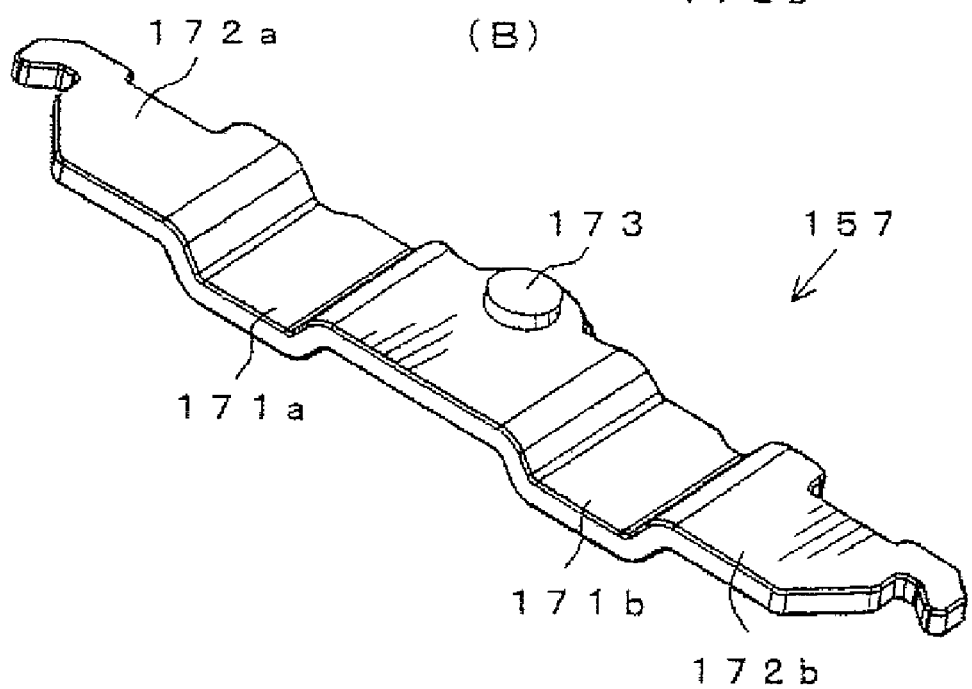

Fig. 25
(A)
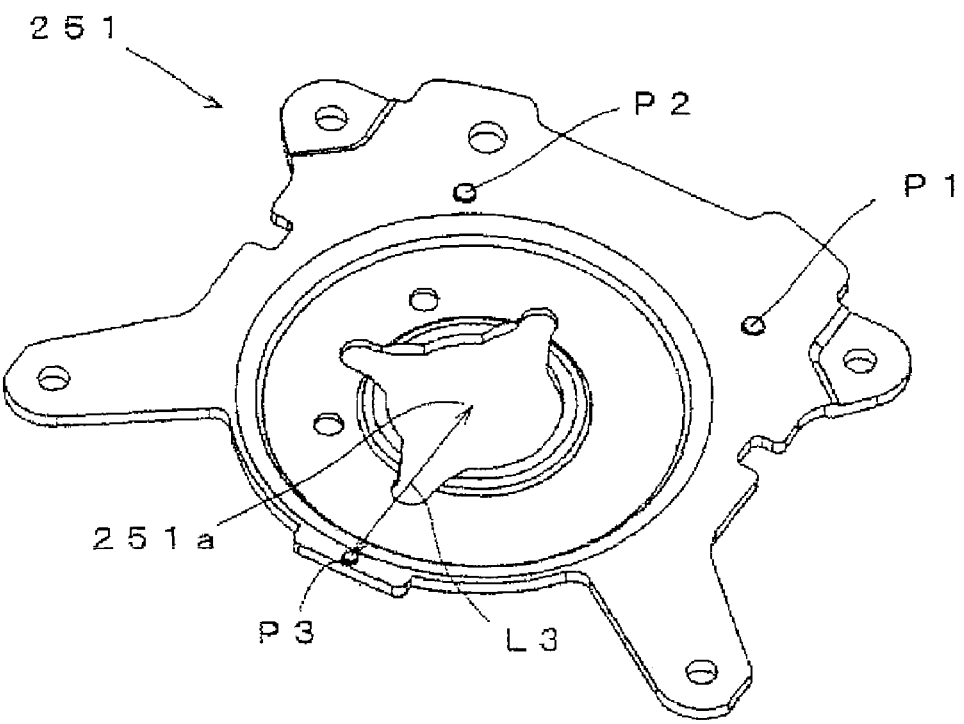
(B)
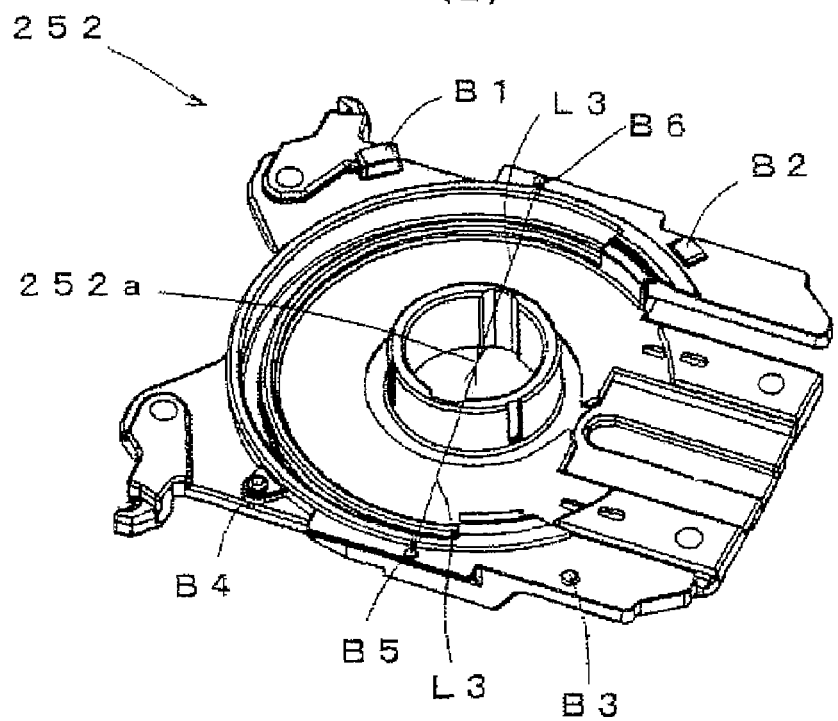

Fig. 26
(A)
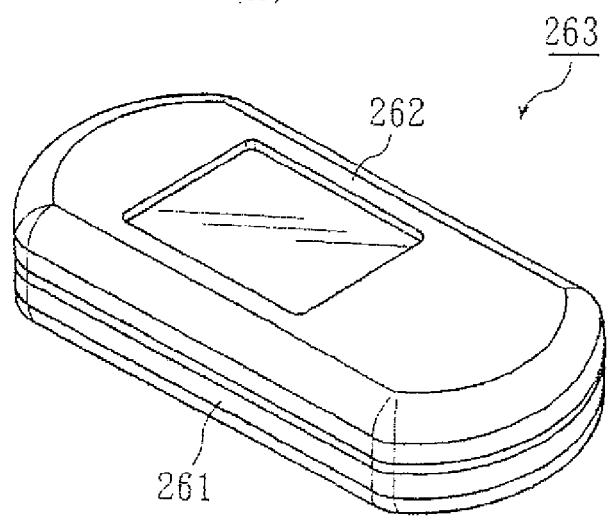
(B)
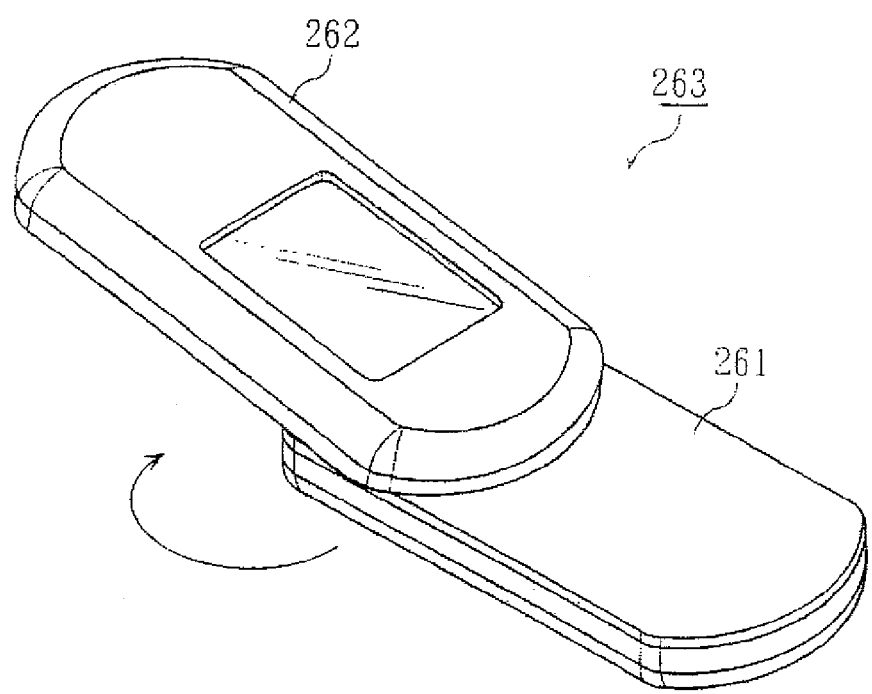
PRIOR ART

PRIOR ART

ROTATION SUPPORTING MECHANISM AND PORTABLE TERMINAL

TECHNICAL FIELD

This invention relates to a rotational supporting mechanism used for an opening and closing portion of a mobile terminal such as a cellular phone and an electronic notebook. More specifically, it relates to a rotational supporting mechanism provided with an efficient opening function that can rotate a cover in a planar direction with a single touch when performing an opening and closing operation, and a mobile terminal.

BACKGROUND ART

The invention will hereinafter be described taking as an example a rotational supporting mechanism that supports a cover of a cellular phone in a manner so as to be able to open and close it.

In general, in the cellular phone into which the rotational supporting mechanism of this type is incorporated to open and close the cover, there is known a cellular phone equipped with a broken type rotational supporting mechanism (cover opening and closing mechanism) in which, from a state in which the cellular phone is folded so that a main body and a cover are superposed on each other, the cover is opened in a direction in which the main body and the cover are superposed is known (for example, see Patent Document 1).

However, in performing an opening operation of the cover attached to one side of such a rotational supporting mechanism, a user, while supporting the main body in one hand, has to hold the cover in the other hand to open it. Thus, opening the cover required both of the hands. Accordingly, it was not possible to perform the opening operation of the cover easily.

Patent Document 1: JP2003-28138

Recently, as shown in FIG. 26(A) and FIG. 26(B), there is known a horizontally opening and closing type cellular phone 263 in which, from a state in which a main body 261 and a cover 262 are superposed on each other, the upper cover 262 is rotated about 180 degrees in a planar direction in which the upper cover 262 being superposed as such so that an opening operation of the cover 262 is performed.

In this case, from a state in which the cellular phone is held in one hand, the upper cover is pushed laterally so that the main body and the cover can be shifted stepwise up and down. This makes it easy to grasp the cover, and facilitates a subsequent rotational operation of the cover.

DISCLOSURE OF INVENTION

Problem to be Solved by the Invention

However, in this case also, an opening operation of the cover cannot be performed in one hand to the end, and both hands were required for completely rotating the cover 180 degrees to the open position.

Further, in the rotational supporting mechanism that opens and closes the cover in the planar direction, in which the body and the cover are superposed as such, a rotational axis is directed perpendicularly and therefore dimensions of the cellular phone are increased. As a result, it becomes difficult to reduce the thickness of the cellular phone. Furthermore, it is required to devise the rotational amount and the rotational direction in opening and closing the main body and the cover so as not to cause twisting of wiring that connects these portions in the rotational direction. Due to the restriction for eliminating the twisting of the wiring, there arises a limit in reduction of the thickness.

Incidentally, as also shown in FIG. 27, in the case where a cover 272 is manually opened and closed in a planar direction in a state in which a main body 271 and the cover 272 are superposed on each other, an excessive pressing force such as a twisting force is apt to be applied to an axially rotatably supporting portion 273. Thus, the axially rotatably supporting portion 273 is required to have a stable structure that does not cause staggering (looseness). When the cover 272 supported by the rotatably axially supporting portion 273 is rotated 180 degrees to perform an opening operation, on the side of a tip end portion 274, which is the farthest from the axially rotatably supporting portion 273, there was fear that staggering occurred in the direction of their superposition even with a slight gap. As the gap is made smaller, staggering on the side of the tip end portion 274 is reduced more. However, it is difficult to eliminate the gap completely. To the contrary, the rotational resistance generated due to the increase of frictional contact increases, so that an opening and closing operational function of the cover deteriorates. In particular, the deterioration of the function of the cover is markedly observed when attempting an automatic opening operation of the cover that automatically rotates the cover to the open position.

However, even with the occurrence of slight staggering in the cover, a sense of stability is impaired, resulting in deterioration of a commercial value of the cellular phone as well as reliability on the users' side. Therefore, a means for solving the problem to which some kind of device is applied is requested. Even in the case of the rotational supporting mechanism that works in the planar direction, the development of a staggering preventing structure capable of easily preventing the staggering was desired.

An object of the present invention is to provide a rotational supporting mechanism which enables a user to open a cover with a single touch of one hand, enables a reduction in thickness, which is convenient to carry, and in which a sense of stability is enhanced by eliminating the staggering of the cover, and a mobile terminal.

Means of Solving the Problem:

SUMMARY OF THE INVENTION

The present invention provides a rotational supporting mechanism, in which a main body and a cover are superposed to be closed, and, from the closed position, the cover is rotated 180 degrees in a planar direction in which they are superposed as such, and is stopped at the 180-degree rotated open position, the rotational supporting mechanism comprising:

an eccentric cam rotating eccentrically with respect to said planar direction, said eccentric cam having a portion corresponding to the closed position at one rotational position with maximum eccentricity on a cam surface and a portion corresponding to the open position at the other position with minimum eccentricity on the cam surface, the positions being 180-degree opposite to each other; and a pressing means, which presses the cam surface of the eccentric cam by setting a pressing direction to the same direction as that connecting both of the portion corresponding to the closed position and the portion corresponding to the open position, the portions being 180-degree opposite to each other through the axis of the eccentric cam, a pressing load applied to, and rotation control over the eccentric cam being increased to stop rotational movement of the eccentric cam when the pressing means is fitted to the portion corresponding to the closed position on the cam surface, while, the pressing load applied to the eccentric cam being reduced as the pressing means approaches a side of the portion corresponding to the open position, the rotation control over the eccentric cam being increased to stop the rotational movement of the eccentric cam when the pressing means is fitted to the position corresponding to the open position, wherein one of the eccentric cam and pressing means is attached to the main body, while the other of the eccentric cam and pressing means is attached to the cover so that the cover is rotationally supported.

The eccentric cam eccentrically rotates in a planar direction. By the pressing force of the pressing means that presses against the cam surface of this eccentric cam, a rotational force is generated in the eccentric cam with different eccentricities. Specifically, the eccentricity amount varies depending on the eccentrically rotational position of the eccentric cam, and the pressing load varies in proportion to the eccentricity amount. Therefore, at the rotational position with maximum eccentricity, where the eccentricity amount is large, the pressing load is high, and a force to move toward the rotational position with minimum eccentricity, where the pressing load is low, works, so that the pressing means generates a rotational force in the eccentric cam.

Therefore, if the rotational position with the maximum eccentricity, to which a high load is applied, is set to the portion corresponding to the closed position of the cover, with mere slight rotation of the eccentric cam from the portion corresponding to the closed position, the rotation control of the eccentric cam is released, and the eccentric cam rotates 180 degrees with great force. Accompanied by this movement, the cover that is integral with the eccentric cam automatically rotates 180 degrees to be opened. Accordingly, a user can perform an opening operation by a single slight push of the cover with one hand, thus improving the opening operationality of the mobile terminal. On the other hand, when the cover is returned to the original closed state, it is possible to return it to the original state by rotating the cover in the opposite rotational direction with the hand.

In the eccentric cam, the outer peripheral surface of the eccentric cam is used as a cam surface. In addition to that, at least one of upper and lower surfaces along the outer peripheral surface is formed with a concave groove or a protrusion to guide the pressing means so that the concave groove and the protrusion can be used for the cam surface.

The pressing means may be constituted of a spring, for example. The pressing force of the spring can always be in press contact with the cam surface of the eccentric cam. Therefore, depending on the contact position with the eccentric cam, its pressing force varies, and also the rotational direction of the eccentric cam varies depending on the contact angle with the cam surface, thus making it possible to cause left-handed rotation or right-handed rotation of the eccentric cam.

In this manner, the cover can automatically be rotated from the closed position to the open position, utilizing the pressing force of the pressing means for the rotational force in the cover-opening direction. In the fitting between the eccentric cam and the pressing means, both of them are constituted in a manner such that they can allow engagement and separation at one point in the rotational direction. For example, the concave portion and the pressing roller as the protruding portion are fitted to each other, positioning of the cover can accurately be performed at one point that the rotation stops, where the concave and protruding portions are fitted to each other. Besides this, positioning of the stop position, whose rotational direction is determined, can accurately be performed using a ball plunger and the like.

Since the main body and the cover that are superposed to be joined are so constructed to rotate relatively via the rotational supporting mechanism. Thus, one side of the member constituting the eccentric cam and pressing means may be attached to the main body side, while the other side of the member is attached to the cover side. In addition to that, these attached sides may also be reversed.

According to the invention, the eccentric cam that rotates in the planar direction, which is suited for the reduction in thickness, is adopted, and the pressing means having small dimensions that presses against the cam surface of the eccentric cam in the planar direction, which is suited for the reduction in thickness, is used in combination with the eccentric cam. Therefore, the dimensions in the vertical direction are not increased, which makes it possible to achieve the reduction in size of the rotational supporting mechanism as well as the reduction in thickness of the mobile terminal.

In another constitution of this present invention, when the portion corresponding to the open position on the cam surface of the eccentric cam is fitted to the pressing means, a control means for controlling excessive rotation beyond the position corresponding to the open position in the same direction as that in which the eccentric cam is rotated 180 degrees to the open direction is provided.

In the control means, for example, if an interlocking piece that rotates with the rotation of the eccentric cam as a rotation controlling means is provided, and a position of the interlocking piece in its rotational direction is controlled at a predetermined position, it is possible to control excessive rotation of the eccentric cam beyond the predetermined position.

Therefore, for example, when the cover is rotated 180 degrees left to perform an opening operation so that the cover and the main body are vertically aligned in series, further left-handed rotation is controlled to maintain the open state. Thus, it is possible to control the excessive rotation beyond the limiting position of the rotation of the cover. Similarly, when the cover is rotated right to perform an opening operation, it is possible to control the excessive rotation of the cover. Accordingly, each of the left-handed and right-handed rotational amounts of the cover can be restricted to 180 degrees, so that internal wiring can also be restricted to the movement within the rotation range of not more than 180 degrees. Consequently, the internal wiring does not incur an excessive twisting action and durability of the wiring is improved.

In another constitution of this invention, the eccentric cam has a recess corresponding to the closed position at one point with maximum eccentricity on the eccentrically rotating cam surface, to which a protruding portion of the pressing means is fitted, and has a recess corresponding to the open position at one point with minimum eccentricity, to which the protruding portion of the pressing means is fitted.

In this case, in the fitting portions to the eccentric cam, which correspond to the open and closed positions of the eccentric cam, a concave portion of the eccentric cam can be fitted to the protruding portion of the pressing means. Thus, the pressing means that is always in contact with the cam surface of the eccentric cam is fitted at one point of the portion corresponding to the open position or the portion corresponding to the closed position, whereby positioning of the open and closed positions, which are located 180 degrees opposite to each other, can accurately be performed, and rotation of the cover can accurately be stopped.

In the concave and protruding portions, if the depth, width and inclined surface of the concave portions and the protruding portion are changed, a sense of operation (click feeling) when performing positioning and opening/closing operation can be changed to a desired value. In the fitting of the concave and protruding portions, the concave portions may be provided on one side of the eccentric cam and the pressing means, while the protruding portion is provided on the other side. Even if the concave portion and protruding portions are provided reversely, the same effect can be obtained.

In another constitution of this invention, the pressing means is equipped with an elastic member, a pressing direction of which is set to the same direction as that connecting both of the portions corresponding to the closed and open positions, which are determined through the axis of the eccentric cam, said portions being 180-degree opposite to each other, and a following member moving back and forth in the pressing direction, based on a pressing force that it receives from the elastic member, to follow along the cam surface of the eccentric cam.

The elastic member is constituted using an elastic body that imparts a pressing force in a pressing direction, for example a coil spring, a plate spring and the like. The following member may be constituted of a contact member that is in smooth contact with the cam surface, for example, a pressing roller.

In this case, it is possible to constitute a pressing means in combination of the elastic member with the following member.

In another constitution of this invention, the pressing means is equipped with a pressing spring, a pressing direction of which is set to the same direction as that connecting both of the portions corresponding to the closed and open positions, which are determined through the axis of the eccentric cam, said portions being 180-degree opposite to each other, a pressing piece moving back and forth in the pressing direction by receiving the pressing force of the pressing spring, and a pressing roller axially supported on the pressing piece in a manner so as to be freely rotatable, and pressing against the cam surface of the eccentric cam integrally with the pressing piece by receiving the pressing force of the pressing spring.

As the pressing spring, for example, a coil spring may be used. The coil spring may be provided in plural number. Only one coil spring may also be provided. For example, in the case where pressing springs are provided on both sides of the eccentric cam, a uniform pressing force can be imparted to the eccentric cam from the left and right via the pressing roller. Therefore, a well-balanced and stable pressing operation can be provided toward the center of the eccentric cam, so that the operation of the eccentric cam, which rotates when receiving the pressing force, is stabilized. Further, even in the case where one pressing spring is provided, the pressing piece is allowed to perform a pressing operation using the principle of leverage, and the pressing roller may be provided at an intermediate position of the pressing piece so that the pressing roller stably presses toward the center of the eccentric cam.

The pressing spring, which is provided on both sides or one side of the eccentric cam, can be set in a manner such that it pulls the pressing roller that is integral with the pressing piece toward the side of the eccentric cam. In this case, the stroke of the pressing spring constituting the pressing means can be disposed along a side surface of the eccentric cam that is parallel to the pressing direction of the eccentric cam. Therefore, the pressing spring and the eccentric cam can efficiently be disposed in a small space in which the pressing direction is small. This makes it possible to reduce the size of the rotational supporting mechanism.

Since the pressing roller is in rotational contact with the cam surface to be followed, a smooth contact operation can be obtained. In addition to the pressing roller, a protruding portion that does not rotate and has a slippery shape can also be substituted for the pressing roller.

If the pressing means is constructed in this manner, the pressing construction having small dimensions, in which the pressing spring(s), the pressing piece and the pressing roller are individually operated in the planar direction, can be made. Thus, a reduction in the thickness of the pressing means can be contrived.

In another constitution of this invention, the control means is provided with a rotation disc that rotates left or right in the planar direction, an interlocking piece that rotates with the rotation disc in the same rotational direction by receiving the rotational force of the rotation disc, and position control portions for controlling excess rotation of the interlocking piece, where the interlocking piece, which rotates left or right with the rotation disc, would rotate beyond the portion corresponding to the open position of the eccentric cam.

In this case, the constitution that the interlocking piece rotates with the rotation disc that is integral with the eccentric cam in the planar direction can control the position of the interlocking piece at the predetermined position. This enables a planar position controlling structure, so that the thickness of a mobile terminal can be reduced. If one end portion and the other end portion of the interlocking piece are configured so that positions of these portions are controlled in its rotational direction, both of the end portions of the interlocking piece can effectively be used as position controlling surfaces, and the position control at the portion corresponding to the open position by the left-handed rotation and that at the portion corresponding to the open position by the right-handed rotation can accurately be set respectively.

In another constitution of this invention, swing preventing portions for preventing the cover from staggering are provided on opposite and superposed surfaces of the main body and the cover in proximity of an axially supporting portion that joins both of the main body and the cover in the direction of superposition to axially support them.

The swing preventing portions are for completely preventing the tip end portion of the cover from unstably staggering in the superposed direction around the axially supporting portion that joins and axially supports the main body and the cover. Since the cause of the staggering is a gap that occurs in the direction of superposition, if a protruding portion, for example, which is to be fitted to the gap between the opposite surfaces in the direction of superposition of the main body and the cover, is formed in a manner so as to be peripherally in contact with the gap, the protruding portion eliminates the room for the occurrence of staggering, whereby the occurrence of staggering in the tip end portion of the cover can be eliminated. In addition to that, besides the protruding portion, a fitting shape suited for swing prevention may be formed between the superposed surfaces, and a member for absorbing swing may also be interposed.

According to the present invention, because of the presence of the swing preventing portions between the main body and the cover, the swing preventing action works in both of the state in which the cover is closed and the state in which the cover is open, so that staggering of the cover can be prevented. For example, in the case where the cover is rotated 180 degrees in a planar direction in which the main body and the cover are superposed as such to perform an opening operation, even if a pressing force in the direction of superposition is applied to the axially supporting portion of the cover, for example, unstable staggering of the cover is eliminated by the swing preventing portions, and a stable sense of opening and closing operations can be obtained.

Further, the swing preventing portions are formed on opposite and superposed surfaces of the main body and the cover in proximity of an axially supporting portion that joins both of the main body and the cover. Thus, even at the open position in which the cover is rotated 180 degrees, the swing preventing portions are in a state in which they are covered by the main body and the cover and not exposed. Therefore, there is no fear of damage due to receiving direct external force from the outside. Further, not seen from the outside, there is an advantage that the appearance is not marred.

In another constitution of the this invention, when the cover is rotated 180 degrees to be located at the open position from the closed position, bosses as the swing preventing portions are formed on the opposite and superposed surfaces of the cover and the main body in a manner such that the protruding bosses on both the opposite surfaces are butted against each other.

According to the present invention, mere contact of the bosses that are butted against each other between the opposite surfaces in the direction of superposition of the main body and the cover eliminates the room for the occurrence of staggering between the opposite surfaces, and the staggering of the cover can completely be eliminated. Therefore, only by providing bosses between the opposite surfaces, a staggering preventing structure of the cover can easily be constructed. For example, if small bosses are protrusively formed in a manner so as to be in point contact with each other, contact resistance is reduced, and a smooth cover opening operation can be secured.

In another constitution of this invention, in the swing preventing portions, a plurality of butting portions of the bosses are dotted, and positions of these respective butting portions are dotted in a manner so as to have different radial distances from an axis of the eccentric cam as their center, and so as not to be present concentrically.

According to the present invention, by dotting a plurality of butting portions for the opposite bosses, contact stability between the main body and the cover is improved. The positions of the bosses that are butted against each other are dotted at different positions, whereby they are not present concentrically. Consequently, the bosses at the butting positions are not present concentrically. Thus, even if a rotational operation of the cover is implemented, it is possible to avoid interference among the bosses, because no other bosses are present in its rotational direction, so that a smooth rotation of the cover is secured.

In another constitution of this invention, the main body and the cover are superposed and opposed at the closed position, and when the eccentric cam is turned 180 degrees with its axis as the center so that the main body and the cover are extended straight, of a tip end side portion and a basal end side portion of the main body and the cover, bosses are formed at positions on the basal end side portion thereof.

According to the present invention, when the cover is closed, because the bosses are opposed to each other on the basal end side portion, using the axially supporting portion as a tilting supporting point, the tip end side portion of the cover can be arranged to be parallel to or inclined in the direction of superposition depending on the degree of protrusion. Therefore, the larger the extent of butting in the basal end side portion, the more the pressing force is applied to the tip end side portion, so that the tip end side portion of the cover is inclined to be in a state of being in press contact with the tip end side portion of the main body. Thus, staggering in the direction of superposition when the cover is closed is eliminated completely.

By not only providing the bosses on the basal end side portion, but also by providing the bosses on the tip end side portion, with the axially supporting portion as the center, the bosses are in stable contact with each other in both of the closed position and the open position of the cover, thus making it possible to eliminate the staggering of the cover.

In another constitution of this invention, in the pressing means, an inclined guide portion, in which a base is placed on an upper surface of the main body, a pressing piece, which is urged toward the base by pressing springs, is pressed against the side of the eccentric cam and guided in a sliding manner so as to go back and forth freely, and both of contact guide portions of the pressing piece and the base are inclined from each other, is provided on both sides in the widthwise direction of the pressing piece.

According to this invention, the sliding guide structure of the pressing piece is provided in the sliding guide portion where the contact guide portion of the pressing piece and that of the base are inclined to be opposed to each other. Therefore, a contact guide function in stereoscopic directions such as upper/lower and left/right directions is obtained, and a stable sliding guide function with less contact fluctuation is obtained, compared with a contact parallel to the widthwise direction of the pressing piece. Furthermore, since the inclined guide portion is provided on both sides in the widthwise direction of the pressing piece, a uniform sliding guide function is obtained on both sides thereof.

In another constitution of this invention, the pressing means has the inclined guide portion on both sides in the widthwise direction of the pressing piece, and a central sliding guide portion formed of an axis portion provided at a central portion in the widthwise direction of the pressing piece and a sliding guide groove formed on the base, a concave portion of which is fitted to the axis portion along the sliding direction.

The axis portion may be a pressing roller that is axially supported at a central portion in the widthwise direction of the pressing piece toward the eccentric cam in a manner so as to be freely rotatable, or an axis portion of the pressing roller.

According to this invention, the sliding guide function of three portions in total, namely the central sliding guide portion in addition to the inclined guide portion on both sides enables the pressing piece to perform a sliding operation in the pressing direction. In particular, even if the contact portions between the pressing piece and the base are worn away with the use for a long time, the inclined contact is secured and therefore, staggering does not occur in a pressing operation, thus making it possible to maintain a stable sliding operation.

With the use of a mobile terminal equipped with such a rotational supporting mechanism, the pressing force of the pressing means imparts the rotational force of rotating the cover from the closed direction to the open direction. Thus, if the cover is slightly rotated from the closed position so that the rotation control is released, the cover starts to rotate in the opening direction with great force to stop after rotating 180 degrees. Therefore, the user can easily perform the opening operation of a mobile terminal with one hand, thus improving the convenience of the mobile terminal. Specifically, if the user slightly pushes the cover by a fingertip of one hand holding the mobile terminal, the opening operation can automatically be performed, thus improving the opening operationality of the mobile terminal. On the other hand, when the cover is returned to the original closed position, it is possible to return it to the original state by rotating the cover in the opposite closed direction with the hand.

Furthermore, when the cover is rotated 180 degrees to perform the opening operation, the cover is prevented from staggering in the direction of the superposition by the swing preventing portions and therefore it is possible to use it as the mobile terminal with a sense of stability without staggering.

The mobile terminal can be applied to a cellular phone consisting of a main body and a cover that are supported by a rotational supporting mechanism so that an opening and closing operations are performed, a mobile device such as an electronic notebook.

According to the invention, there can be constructed a rotational supporting mechanism having improved use performance, in which a cover opening operation in a planar direction is automated instead of being done manually so that the user is enabled to perform an opening operation of the cover with one hand, is constructed, and moreover a thin type mobile terminal having a reduced height-wise dimension, which is suited to carrying.

BRIEF DESCRIPTION OF DRAWINGS

FIG. 4 is a perspective view showing an operational state of left-handed rotation of the cover of Embodiment 1;

FIG. 8 represents outer perspective views of the eccentric cam of Embodiment 1, which are enlarged and viewed from obliquely above as well as from the top;

FIG. 9 represents perspective views of the rotational supporting mechanism of Embodiment 1 showing its appearance when starting right-handed rotation of the cover, and its internal state;

FIG. 10 represents perspective views of the rotational supporting mechanism of Embodiment 1 showing its appearance and internal state;

FIG. 11 represents explanatory views showing each correspondence relationship between an interlocking piece and a push/turn piece of Embodiment 1;

FIG. 13 represents perspective views showing a correspondence relationship between various rotational positions of the interlocking piece and the push/turn piece of Embodiment 1;

FIG. 19 is a perspective view showing the arrangement of bosses as swing preventing portions of Embodiment 3;

FIG. 22 represents perspective views of essential portions showing a sliding state of a slider of Embodiment 3;

FIG. 23 represents perspective views in enlargement showing the front and back of the slider of Embodiment 3;

FIG. 25 is a perspective view showing the arrangement of bosses as swing preventing portions of Embodiment 4;

FIG. 26 represents perspective views showing an opening operational state of a cover of a conventional cellular phone.

Figure 1:
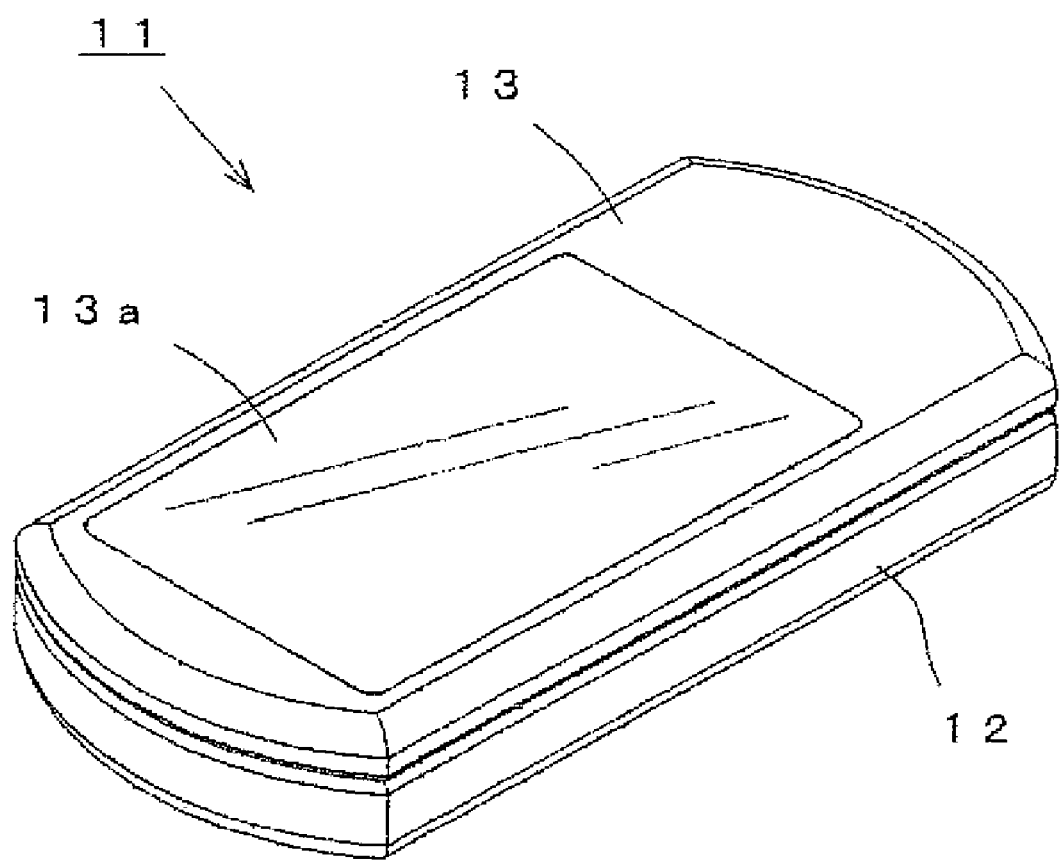
FIG. 1 is an outer perspective view showing a state in which a cellular phone of Embodiment 1 is closed.

DESCRIPTION OF NUMERALS 11, 151 . . . cellular phone
12, 153 . . . main body
13, 154 . . . cover
14, 141, 152 . . . rotational supporting mechanism
18, 143, 158 . . . pressing roller
19, 161 . . . eccentric cam
21, 160 . . . interlocking piece
31 . . . recess corresponding to closed position
32 . . . recess corresponding to open position
37, 38 . . . rotational stopper
155, 252 . . . base
157 . . . slider
163, 251 . . . plate
166 . . . swing preventing portion
167 . . . inclined guide portion
168 . . . central sliding guide portion
P1-P3, B1-B6 . . . boss
L1-L3 . . . distance

DETAILED DESCRIPTION OF THE PREFERRED EMBODIMENTS

Next, embodiments of the rotational supporting mechanism of the present invention, which performs a cover opening and closing operation by a combination of a planar rotational structure suitable for reduction in thickness and a planar pressing structure in correspondence with the planar rotational structure, and which automates the cover opening operation, will be described.

Embodiment 1

FIG. 1 is a case where the rotational supporting mechanism is applied to a cellular phone, which will be described with reference to the accompanying drawings.

FIG. 1 shows a horizontal rotation type cellular phone. The horizontal rotation type cellular phone 11 is constructed to be a horizontal rotation type in which a rectangular plate-shaped body 12 and a cover 13 of the same shape are superposed so that they are capable of being opened and closed in a planar direction, and the cover 13 is rotated in the planar direction in which they are superposed as such.

Outer surfaces such as upper surfaces and side surfaces of the main body 12 and the cover 13 are equipped with an indicator, an input device and an antenna (not shown) for utilizing various electronic information including phone calls and e-mails.

Figure 2:
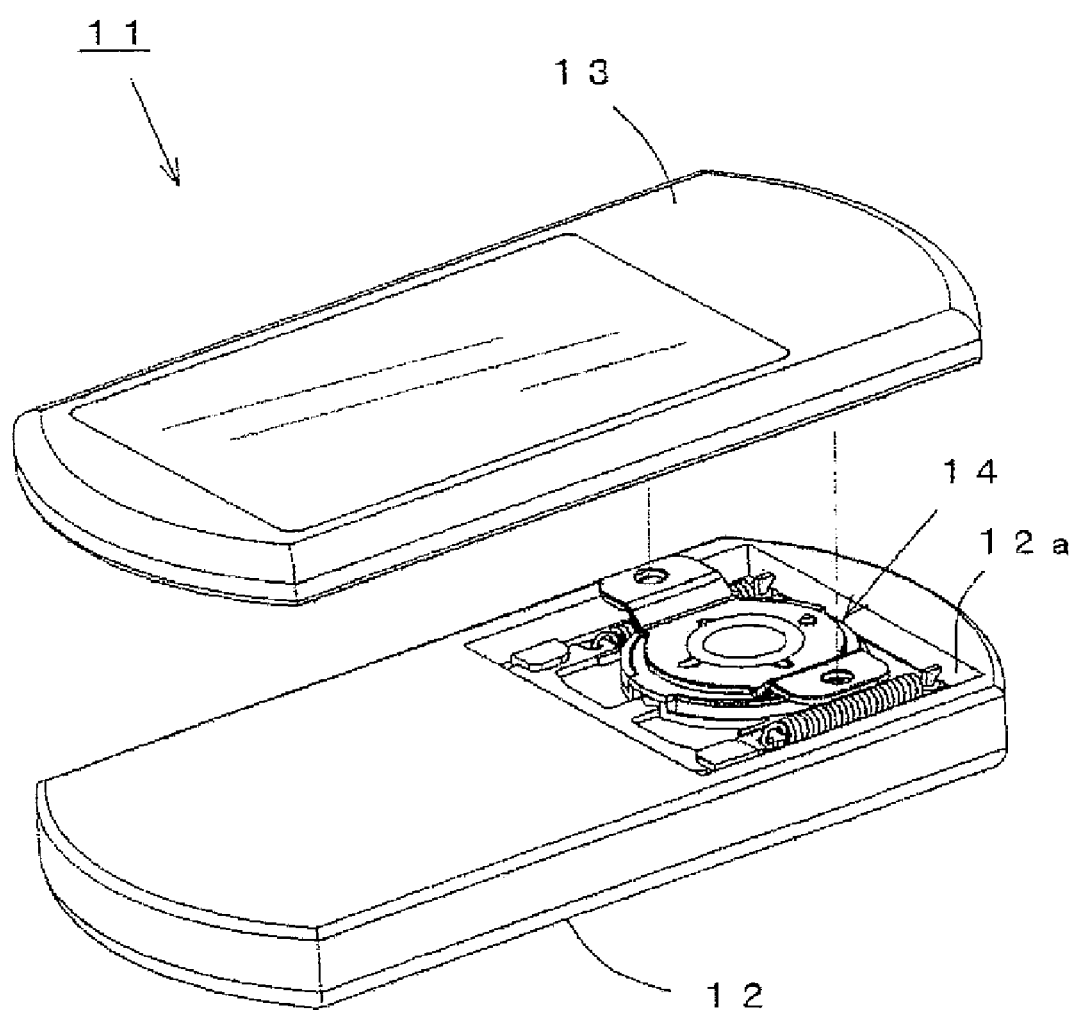
FIG. 2 is a perspective view showing a correspondence relationship between a main body and a cover of Embodiment 1 in relation to joining them.

In joining the main body 12 to the cover 13, as shown in FIG. 2, the lower main body 12 and the upper cover 13 are joined to each other in a manner so as to be rotatable in the planar direction via a rotational supporting mechanism 14.

Figure 3:
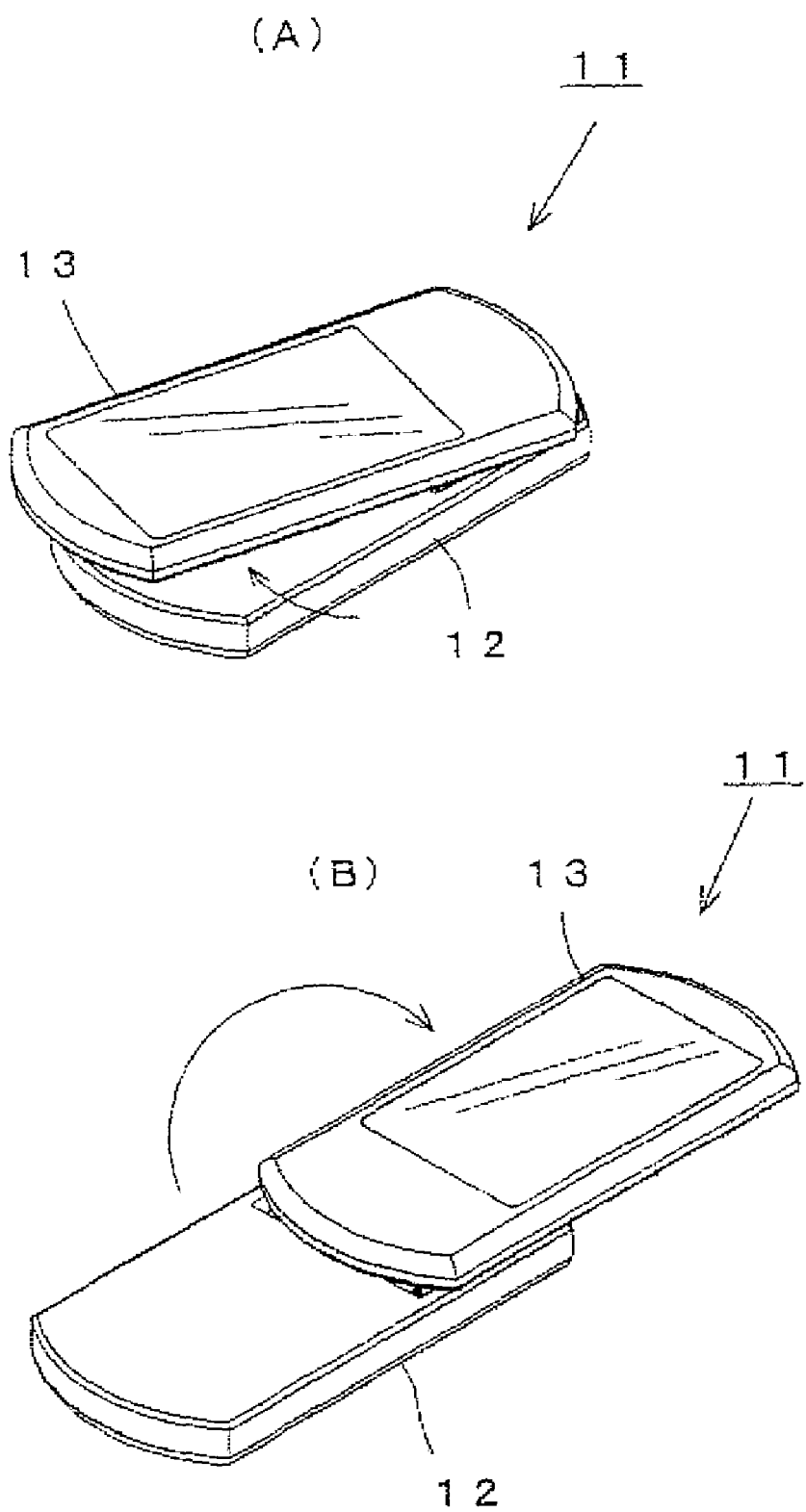
FIG. 3 is a perspective view showing an operational state of right-handed rotation of the cover of Embodiment 1.

In the case where the cover 13 is rotated in this planar direction, as shown in FIG. 3(A), a side surface of the closed cover 13 is slightly pushed and shifted to the left, position control of the rotational supporting mechanism 14 is released while being interlocked with this movement, which can cause the cover 13 to generate a rotational force in an opening direction. Therefore, as shown in FIG. 3(B), the cover 13 is capable of being opened by automatically rotating 180 degrees in the opening direction, and the main body 12 and the cover 13 stop in a state in which they are longitudinally extended straight.

Similarly, as shown in FIG. 4(A), also in the case where a side surface of the cover 13 is pushed slightly to the right by a fingertip, the rotational supporting mechanism 14 is caused to generate a rotational force in the opening direction while being interlocked with this movement. Thereafter, as shown in FIG. 4(B), the cover 13 is opened by automatically rotating 180 degrees in the same direction, and the main body 12 and the cover 13 stop in a state in which they are longitudinally extended straight.

Figure 5:
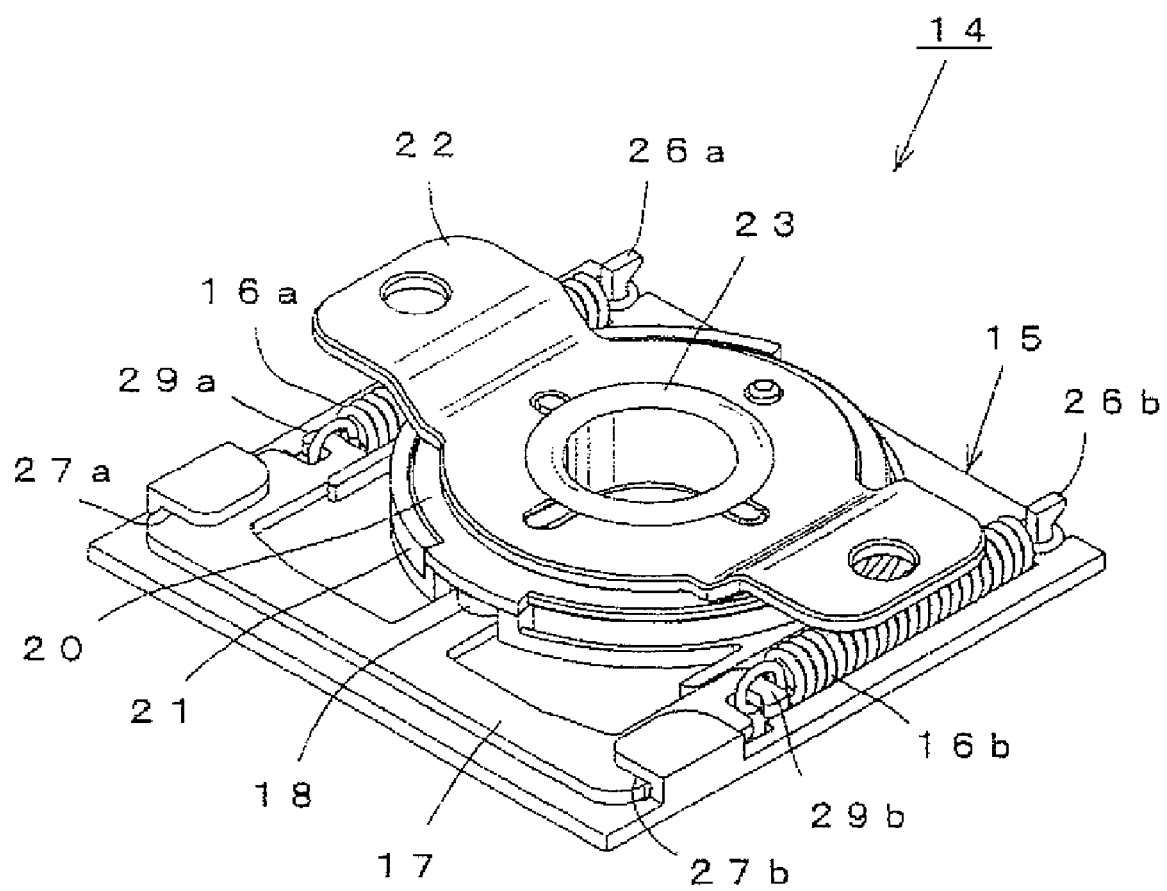
FIG. 5 is a perspective view, in enlargement, of essential portions showing a rotational supporting mechanism of Embodiment 1.
Figure 6:
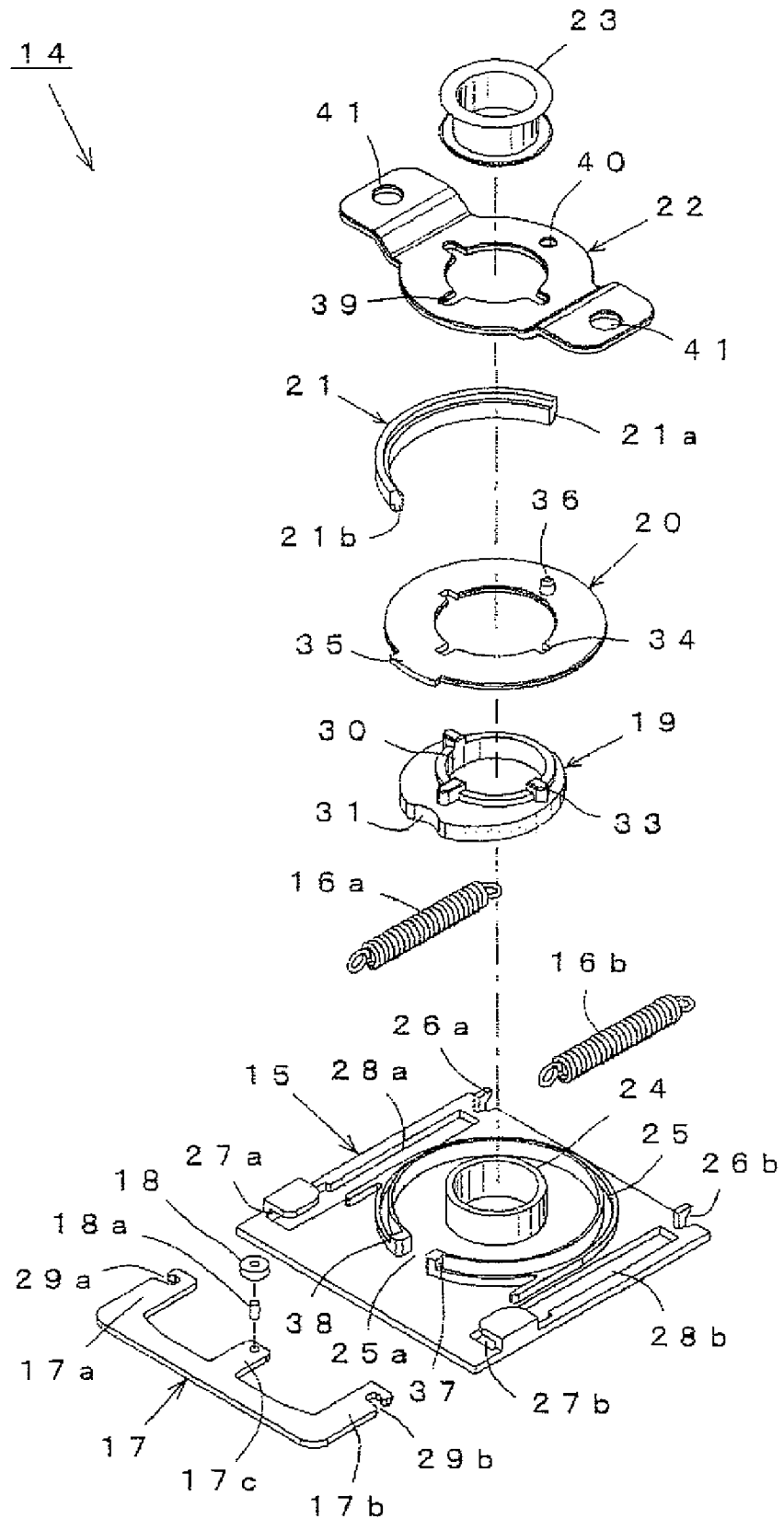
FIG. 6 is an exploded perspective view showing the rotational supporting mechanism of Embodiment 1.

The rotational supporting mechanism 14 has a horizontal rotation type symmetrical supporting mechanism provided with a rotational force imparting function that rotates the cover 13 180 degrees from the closed position to the open position. The rotational supporting mechanism is such that, on an upper surface of a base 15, there are mounted parallel springs 16*a*, 16*b*, a slider 17, a pressing roller 18, an eccentric cam 19, a rotation disc 20, an interlocking piece 21, and a plate 22 as shown in FIGS. 5 and 6. Among these, the eccentric cam 19, the rotation disc 20 and the plate 22, which correspond to a rotational main part, are assembled by fixing them onto the base 15 with a caulking tube 23 so that they are rotatable.

The base 15 having a square shape is sunk in a recess 12*a* (see FIG. 2) on one side of an upper surface of the main body 12 so as to be integrally fixed thereto. An upper surface of the base 15 is protrusively provided with an axially supporting cylinder 24, a circular guide groove 25, spring hooking portions 26*a*, 26*b*, sliding guide grooves 27*a*, 27*b*, and the above-mentioned respective parts are fitted to these portions.

First, the axially supporting cylinder 24 is formed by providing a short cylinder protrusively at a central portion of the upper surface of the base 15. The caulking tube 23 is inserted through an inner circumferential surface side of the axially supporting cylinder 24, while the eccentric cam 19, the rotation disc 20 and the plate 22 are freely rotatably axially supported on an outer circumferential surface side thereof.

A circular guide groove 25 having a concave shape in cross section is protrusively provided in an outer circumference that is concentric with the axially supporting cylinder 24. An interlocking piece 21 described below is fitted into the circular groove 25 in a manner so as to be slidable, thereby being guided in a sliding manner in the circular direction. Further, at edges on both the right and left of one side of the base 15, with the axially supporting cylinder 24 as the center, spring hooking portions 26*a*, 26*b* are protrusively formed, where one end portions of the parallel springs 16*a*, 16*b* (described below) are connected, respectively. Further, at edges on both the right and left of the other side of the base 15, inverted L-shaped pieces are protrusively formed, and sliding guide grooves 27*a*, 27*b* are formed, where a part of the slider 17 is guided in a sliding manner in a pressing direction. Furthermore, between the pair of the right and left spring hooking portions 26*a*, 26*b* and the sliding guide grooves 27*a*, 27*b*, elongate spring housing openings 28, 28*b* that guide the springs in an expanding and contracting manner while supporting lower sides of the springs.

Next, the parallel springs 16*a*, 16*b* will be described.

The parallel springs 16*a*, 16*b*, which have the same shape on the right and left, are arranged in parallel on the base 15. The parallel springs 16*a*, 16*b*, which have an elongate coil shape, expand and contract in a linear direction. The expanding and contracting one end portions are hooked over the spring hooking portions 26*a*, 26*b*, while the other end portions are hooked over spring hooking portions 29*a*, 29*b* of the slider 17 (described below).

Using the spring hooking portions 26*a*, 26*b* on the base as reference positions for expansion and contraction, a tensile action is developed on the other sides of the parallel springs 16*a*, 16*b*. Thereby, in the slider 17 on the other side, a pressing force is set in the same direction as the tensile direction of the parallel springs 16*a*, 16*b*, so that the slider 17 performs a pressing operation toward the eccentric cam 19. The lower sides of the parallel springs 16*a*, 16*b* are guided and housed in the spring housing openings 28*a*, 28*b* so as to be stably contracted and expanded.

The slider 17 has an E flat plate shape, and the spring hooking portions 29*a*, 29*b* are formed at both edge portions 17*a*, 17*b* of the E shape. The other side end portions of the parallel springs 16*a*, 16*b* are hooked over these spring hooking portions 29*a*, 29*b*, whereby the slider 17 is pulled in the pressing direction so as to slide in the expansion-contraction direction of the parallel springs 16*a*, 16*b*.

On the upper surface of the base 15 opposite to the sliding direction of both the edge pieces 17*a*, 17*b* of the slider 17, the sliding guide grooves 27*a*, 27*b* are each formed between the upper surface of the base 15 and the inverted L-shaped piece so that the slider 17 is stably guided in a sliding manner.

Further, at a protruding piece 17*c* that protrudes in a central portion of the E shape of the slider 17, the pressing roller 18 is axially supported by the pin 18*a* so as to be freely rotatable in the planar direction. Therefore, one point of the pressing roller 18 is always in press contact with the eccentric cam 19 (described below) while being located at the central portion of the slider 17.

Figure 7:
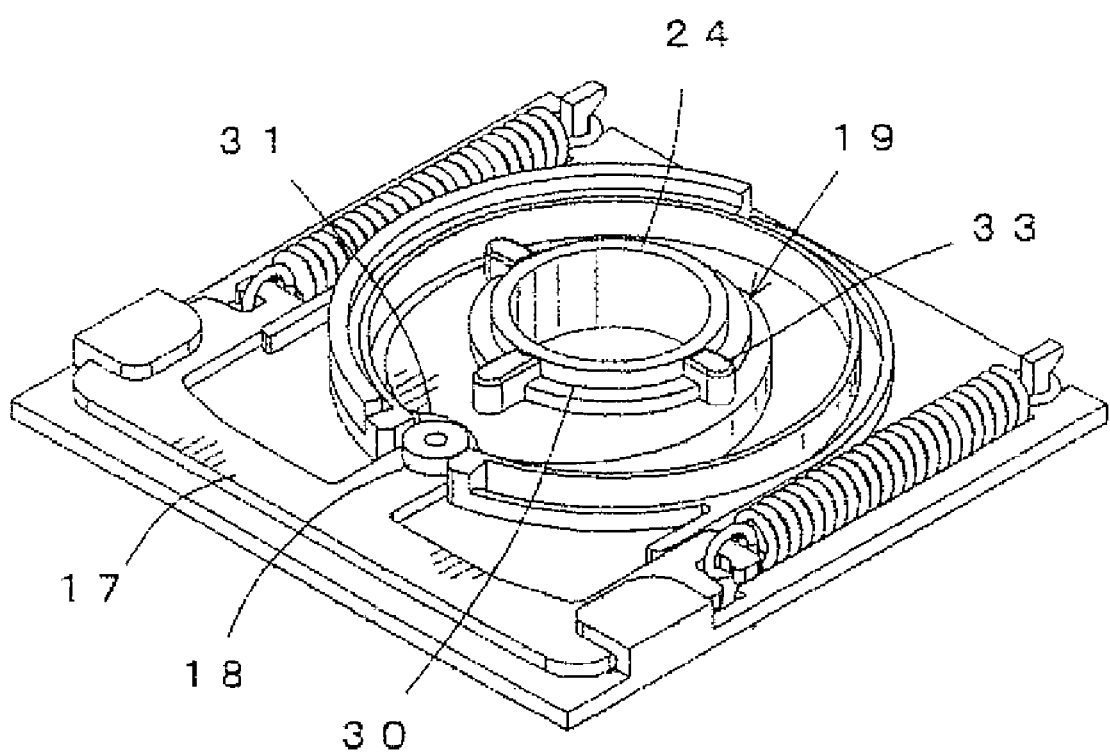
FIG. 7 is an outer perspective view showing a correspondence relationship between an eccentric cam and a pressing roller in a waiting state of the rotational supporting mechanism of Embodiment 1.

As shown in FIGS. 7 and 8, the eccentric cam 19 has an elliptic plate shape and has an axial hole 30 to be inserted over the axially supporting cylinder 24 so that it is freely rotatable. The eccentric cam 19 rotates around the axial hole 30, and has a recess 31 corresponding to the closed position, which recess receives a roller surface of the pressing roller 18, at one of the 180-degree opposite rotational positions on an outer circumferential surface thereof, at which the eccentricity reaches the maximum. On the other hand, the eccentric cam 19 has a recess 32 corresponding to the open position, which receives the roller surface of the pressing roller 18, at the other of the 180-degree opposite rotational positions, at which the eccentricity reaches the minimum.

In this case, when a protruding roller surface of the pressing roller 18 is fitted into the recess 31 corresponding to the closed position, which has large eccentricity, the spring pressure increases, the pressing load on, and the rotation control over the eccentric cam 19 are increased, so that the rotation of the eccentric cam 19 is controlled. As a result, the rotation of the eccentric cam 19 is stopped at a time point that the pressing roller 18 is fitted into the recess 31 corresponding to the closed position of the eccentric cam 19.

When the eccentric cam 19 is rotated, as the pressing roller 18 approaches from the recess 31 corresponding to the closed position to the recess 32 corresponding to the open position, the eccentricity decreases. Thus, the pressing load on the eccentric cam 19 is reduced. When the protruding portion of the pressing roller 18 is fitted into the recess 32 corresponding to the open position, because the eccentricity of the eccentric cam 19 is small, the spring pressure is reduced, and the pressing load on the eccentric cam 19 is reduced. Since, however, the recessed and protruding portions are fitted into each other, they have high control over the eccentric cam 19, so that the rotation of the eccentric cam is controlled. For that reason, at a time point that the protruding portion of the pressing roller 18 is fitted into the recess 32 corresponding to the open position of the eccentric cam 19, the rotation of the eccentric cam 19 is stopped.

When the projecting portion of the pressing roller 18 is fitted into the recess 31 corresponding to the closed position or the recess 32 corresponding to the open position, the pressing roller 18, which moves back and forth with the slider 17, is pressed toward the center of the eccentric cam 19. Therefore, in the eccentric cam 19 that receives this pressing force, the rotation controlling force is enhanced, and loads on the rotational directions of both sides are balanced, so that the pressing balance is kept. Accordingly, the rotational force is not generated in the eccentric cam 19 at the recesses 31, 32 corresponding to the respective positions.

An upper circumferential surface of the axial hole 30 is protrusively provided with a plurality of engaging protrusions 33 serving as rotation stoppers, and the rotation disc 20 and the plate 22 (described below) are integrally engaged with them from above.

The above rotation disc 20 is fitted to an outer circumferential edge portion of the axial hole 30 of the eccentric cam 19 from above, and engaging recesses 34 are engaged with the engaging protrusions 33 of the eccentric cam 19, whereby the rotation disc 20 is integrally engaged with and fixed to the eccentric cam 19. A part of an outer circumferential surface of the rotation disc 20 is provided with a push/turn piece 35 extended radially. The push/turn piece 35 pushes and turns the interlocking piece 21 (described below) to rotate it when the rotation disc 20 rotates. Furthermore, an upper surface of the rotation disc 20 is erectly provided with an erecting pin 36, and a press-fitting opening 40 of the plate 22 (described below) is press fitted around the erecting pin 36 so as to be fixed thereto, whereby the rotation disc 20 and the plate 22 are integrated with each other.

The interlocking piece 21, which has an arc shape along a circular arc having the same curvature as that of the circular guide groove 25, is slidably fitted into the circular guide groove 25. When the rotation disc 20 is rotated, the interlocking piece 21 is rotated with the rotation disc 20 in the same direction as that in which it is pressed by the push/turn piece 35 integrally rotating with the rotation disc 20. One end face 21a and the other end face 21b of the elongate arch shaped interlocking piece 21 serve as position control surfaces of the rotational direction, whereby the positions of both of the end faces 21a, 21b are controlled within the circular guide groove 25 (described below).

The circular guide groove 25 is arranged, with the eccentric cam 19 as the center, in a manner so as to surround an outer circumferential side thereof. The circular guide groove 25 is formed into a circular shape large enough not to be in contact with the eccentric cam 19 even if it is eccentrically rotated. Further, in the circular guide groove 25, a movement path 25a for the pressing roller is formed at a position opposite to the pressing roller 18 that presses against the eccentric cam 19 from the outside thereof, while being opposed thereto, by cutting a part of the circular guide groove 25. This enables the pressing roller 18 to move in a sliding manner toward its pressing direction.

The circular guide groove 25 has a total guide length corresponding to an arc length of, for example, 350 degrees in the rotational direction, which is obtained by subtracting the passage width of the movement path 25a for the pressing roller, which has been cut off, from the total circumferential length of the circular guide groove 25. Within the rotational range with this guide length, the interlocking piece 21 rotates left or right, and moves with the circular disc 20. Furthermore, of both guide end portions in the rotational direction, one end portion serves as a left-handed rotational stopper 37, while the other end portion serves as a right-handed rotational stopper 38.

Therefore, when the interlocking piece 21 rotates left or right while rotating with the rotation disc 20, and the eccentric cam 19 integral with the cover 13 reaches the recess 32 corresponding to the open position, the one end face 21a of the interlocking piece 21 rotating with the rotation disc 20 is position controlled by the left-handed rotational stopper 37. Alternatively, the other end face 21b of the interlocking piece 21 is position controlled by the right-handed rotational stopper 38. Therefore, excessive rotation of the interlocking piece 21, which would rotate beyond the recess 32 corresponding to the open position is prevented.

Accordingly, when the rotation of the interlocking piece 21 is controlled in the one or the other rotational direction, the rotation of the rotation disc 20 is controlled in the same direction, so that the rotation of the cover 13 at the open position is stopped.

The left-handed rotational stopper 37 and the right-handed rotational stopper 38 are provided so as to be symmetrical with each other, and receives the interlocking piece 21 that moves in a circular shape within the circular guide groove 25 to control the rotation of the interlocking piece 21. Contrary to this, because the push/turn piece 35 of the rotation disc 20 rotates at a position higher than the position of each of the rotational stoppers 37, 38, it does not come in contact with the rotational stopper 37, 38, which allows 360-degree rotation. Therefore, no trouble is caused in its rotational direction.

Thus, the rotation disc 20 at a waiting position is in a state in which it is capable of rotating with the interlocking 21 via the push/turn piece 35. This allows the cover 13 that is integral with the rotation disc 20 to rotate in either of the left- or right-handed direction. Contrary to that, when the cover 13 is rotated 180 degrees to perform an opening operation, the one end face 21a or the other end face 21b of the interlocking piece 21 comes in contact with any of the respective rotational stoppers 37, 38, so that the rotation of the interlocking piece 21 is controlled. Consequently, the rotation of the rotation disc 20 at the open position is controlled. Accordingly, the cover 13 integrated via the rotation disc 20 and the plate 22 is prevented from rotating excessively at the open position.

The plate 22, in which engaging recesses 39 to be engaged with the engaging protrusions 33 of the eccentric cam 19 are formed, is superposed on the eccentric cam 19 from above so that they are integrally engaged with each other. At the time of the engagement, the press-fitting opening 40 of the plate 22 is press-fitted around the erecting pin 36 of the rotation disc 20 so that the rotation disc 20 and the plate 22 are integrally joined to each other. Joining openings 41 formed in both sides of the plate 22 are fixed to joining pins (not shown) of the cover 13, and the plate 22 is integrally attached to the cover 13. Consequently, the main body 12 and the cover 13 are integrally joined to each other. The cover 13 rotates integrally with the eccentric cam 19, the rotation disc 20 and the plate 22, with the axially supporting cylinder 24 as the center. As a result, the cover 13 rotates left or right in the planar direction.

The caulking tube 23 is inserted through the inner circumferential surface side of the axially supporting cylinder 24, so that the members from the upper plate 22 to the lower base 15 are joined and fixed in a calking manner so that the rotation disc 20 and the eccentric cam 19 are rotatable.

An opening and closing operations of the thus constituted rotational supporting mechanism 14 will specifically be described with reference to the operation explanatory drawings shown in FIGS. 9-13.

Usually, in a waiting state of the cellular phone 11, the main body 12 and the cover 13 are in a closed state in which they are closed and superposed (see FIG. 1). If a user, with the closed-state cellular phone 11 in his or her hand, slightly shifts the cover 13 to the right in the planar direction, for example, with fingertips of the hand (see FIG. 3), the plate 22 and the rotation disc 20 of the rotational supporting mechanism 14 are slightly rotated in the same "right" direction as shown in FIG. 9(A).

At this time, as shown in FIG. 9(B), the eccentric cam 19 is also slightly rotated right. More specifically, the fitting between the rotation roller 18 and the recess 31 corresponding to the closed position of the eccentric cam 19 is released, so that the eccentric cam 19 is slightly rotated right.

In this case, the fitting between the recess 31 corresponding to the closed position of the eccentric cam 19 and the protruding portion of the pressing roller 18 slightly slips, so that the fitting at their mutual closed position released. Therefore, the eccentric cam 19 starts to rotate right with great force in a manner so as to avoid the pressing force of the roller 18 that applies a high load to it. As a result, the eccentric cam 19, which receives a pressing force, rotates 180 degrees immediately from the recess 31 corresponding to the closed position to the recess 32 corresponding to the open position.

As shown in FIG. 10(B), when the eccentric cam 19 is rotated 180 degrees, the recess 32 corresponding to the open position and the protruding portion of the pressing roller 18 are fitted to each other. At the time that the recess 32 is fitted to the protruding portion, the rotation of the eccentric cam 19 is controlled, and the pressing force of the pressing roller and the pulling force of the parallel springs 16a, 16b is balanced, whereby the rotation of the eccentric cam 19 is stopped. At the time that the eccentric cam 19 rotates with great force, as shown in FIG. 10(A), the cover 13 that is integral with the eccentric cam 19 rotates 180 degrees with great force, so that an opening operation of the cover 13 is automatically implemented. Since the eccentric cam 19 has a symmetrical structure, this opening operation is performed in the same manner also in the left-handed rotation.

In this manner, if the rotational position with the maximum eccentricity, to which a high load is applied, is set to the recess 31 corresponding to the closed position of the cover 13, with mere slight rotation of the eccentric cam 19 from the recess 31 corresponding to the closed position, the eccentric cam 19 rotates 180 degrees with great force. Accompanied by this movement, only by manually implementing initial rotation of the cover 13 that is integral with the eccentric cam 19, then, the cover 13 automatically rotates 180 degrees to be opened.

Therefore, the user can perform an opening operation by a single slight push of the cover 13 with one hand, thus improving the opening operationality of the cellular phone 11. On the other hand, when the cover 13 is returned to the original closed state, it is possible to return it to the original state by rotating it in the opposite rotational direction with the hand.

Next, in parallel with the above opening operation, a rotation controlling operation of the cover 13 that controls the rotation amount of the cover 13 when it rotates 180 degrees will be described.

Figure 12:
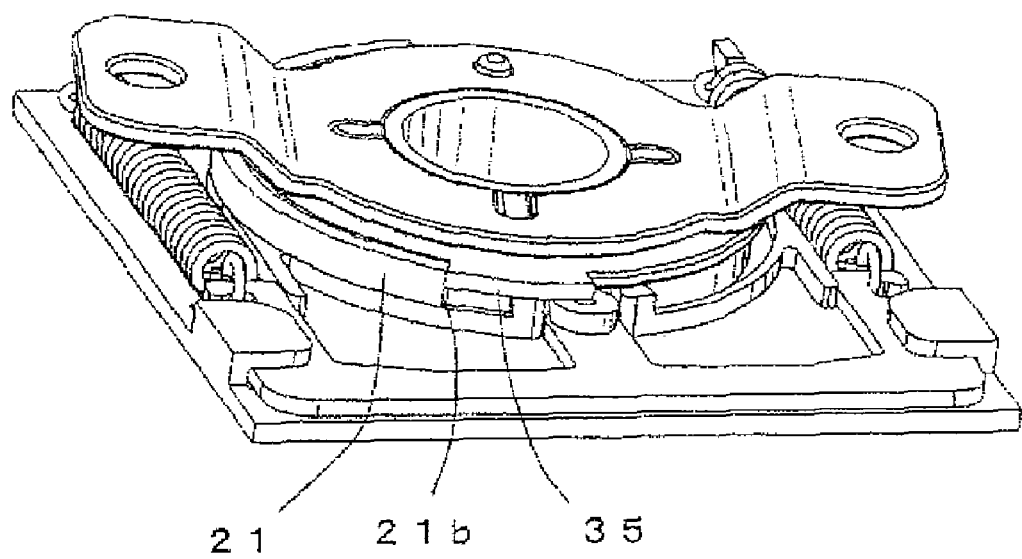
FIG. 12 is a perspective view showing in enlargement a state in which the interlocking piece of Embodiment 1 starts to rotate right.

When the cover 13 is in the closed state, the push/turn piece 35 of the rotation disc 20 is located at the waiting position in the lower side of the eccentric cam, and waiting to rotate as shown in FIG. 11(A). From this waiting state, when the rotation disc 20 that is integral with the plate 22 is slightly rotated right, the other end face 21b of the interlocking piece 21, which comes in contact with the rotation side of the push/turn piece 35 of the rotation disc 20, is pushed, so that the interlocking piece 21 rotates with the rotation disc 20 as shown in FIG. 11(B) and FIG. 12. Then, when the push/turn piece 35 rotates 180 degrees and the cover 13 reaches the closed position as shown in FIG. 11(C), the interlocking piece 21 also rotates 180 degrees. At this time, the one end face 21a of the interlocking piece 21 comes in contact with the left-handed rotational stopper 37, so that its rotation is controlled.

Therefore, in the case where the cover 13 is rotated 180 degrees right to perform the opening operation, more right-handed rotation is controlled so that the open position is maintained. Therefore, it is possible to control an excess rotational operation of the cover 13. As shown in FIG. 13(A), if the cover 13 is rotated 180 degrees in the opposite direction, the rotation disc 20 is also returned to the original position. Similarly, in the case where the cover 13 is rotated right to perform the opening operation, it is also possible to control an excess rotational operation of the cover 13, because the eccentric cam 19 has a symmetrical structure.

Further, in the case where the opening operation is interrupted in the middle of the opening operation, the interlocking piece 21 intervenes as such at an intermediate position of the circular guide groove 25. However, as shown in FIG. 13(C), the push/turn piece 35 of the rotation disc 20 pushes the interlocking piece 21 so that the interlocking piece 21 is allowed to rotate with the rotation disc 20 in the next opening operation. Therefore, whatever position the interlocking piece 21 is located in the circular guide groove 25, the position of the interlocking piece 21 can surely be controlled.

Since the rotation amounts of the left- and right-handed rotations of the cover 13 can be restricted to 180 degrees respectively, internal wiring can also be restricted to the movement within the rotation range of not more than 180 degrees. Consequently, the internal wiring does not incur an excessive twisting action. Therefore, even if the cover is frequently opened and closed, the wiring can stably be maintained.

Embodiment 2

Figure 14:
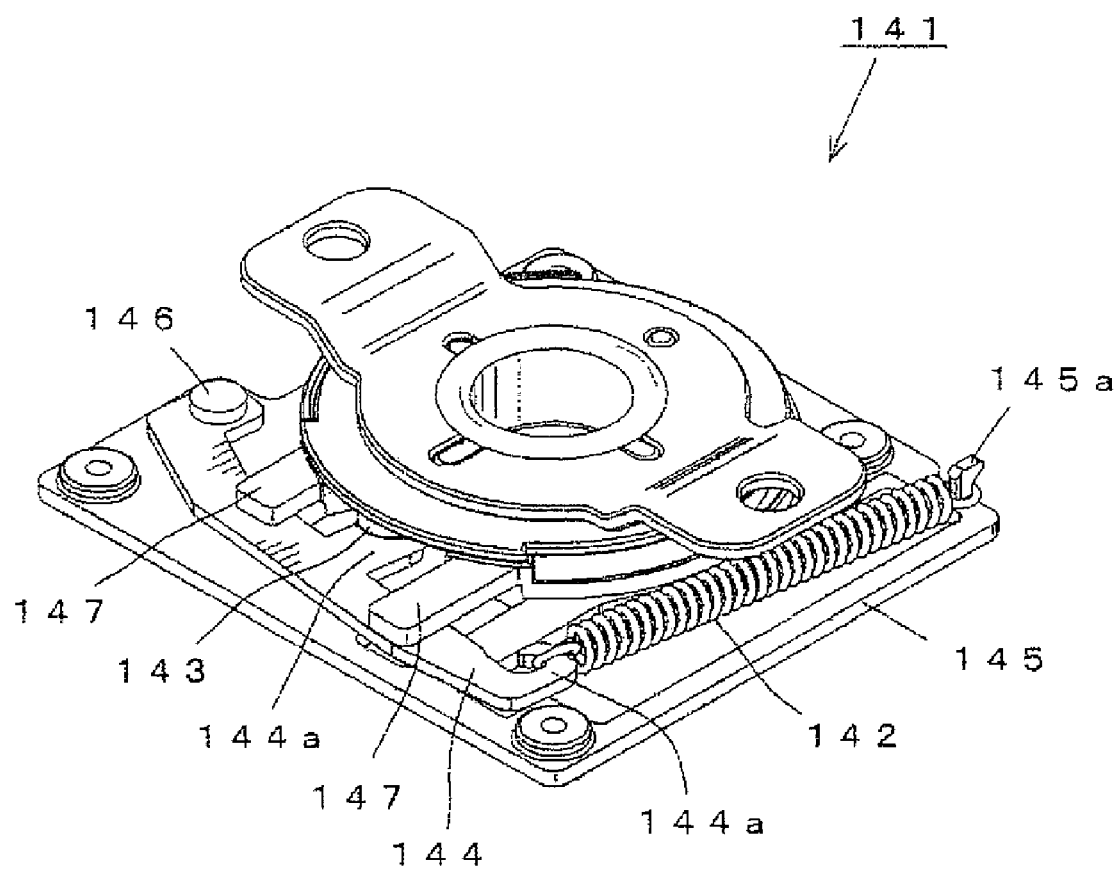
FIG. 14 is a perspective view showing another pressing structure of a rotational supporting mechanism of Embodiment 2.

FIG. 14 shows Embodiment 2 of the rotational supporting mechanism. Since this rotational supporting mechanism 141 and the already described rotational supporting mechanism 14 of Embodiment 1 have the same structure except for the pressing structure, only the different pressing structure will be described.

The pressing structure of the rotational supporting mechanism 141 is made up of one coiled pressing spring 142 in combination with a tilt lever 144 provided with a pressing roller 143 using the principle of leverage.

Use of the one pressing spring 142 has reduced the number of components. The elongate coiled pressing spring 142 is connected with the tilt lever 144 by hooking a basal end portion of the pressing spring 142 over a spring hooking portion 145a protrusively provided at one corner on a base 145, and hooking a free end side thereof, which expands and contracts from this point, over a free end side of the tilt lever (described below).

The tilt lever 144 is formed in an E shape. A basal end portion of the tilt lever 144 is axially supported via a support pin 146 provided at a corner opposed in a diagonal direction to the spring hooking portion 145a on the base 145 in a manner such that the tilt lever 144 can freely be tilted. Further, at a protruding piece 144a that protrudes at a central portion of the E shape of the tilt lever 144, the pressing roller 143 is axially supported so as to be freely rotatable in a planar direction.

A free end portion of the pressing spring 142 is connected with a spring hooking portion 144a formed at the free end portion of the tilt lever 144. Thereby, the tilt lever 144 is axially supported in a manner so as to be able to be freely tilted in a pressing direction, using the support pin 146 as a tilting supporting point, by the principle of leverage. Based on this arrangement, the pressing roller 143 is pressed and urged in the pressing direction. Tilting guide pieces 147 which are parallel to an upper surface of the base 145 and guide a tilting movement are provided in a tilting direction of the tilt lever 144. With such a pressing structure, the same effect as that in the already described embodiment can be obtained.

Embodiment 3

Figure 15:
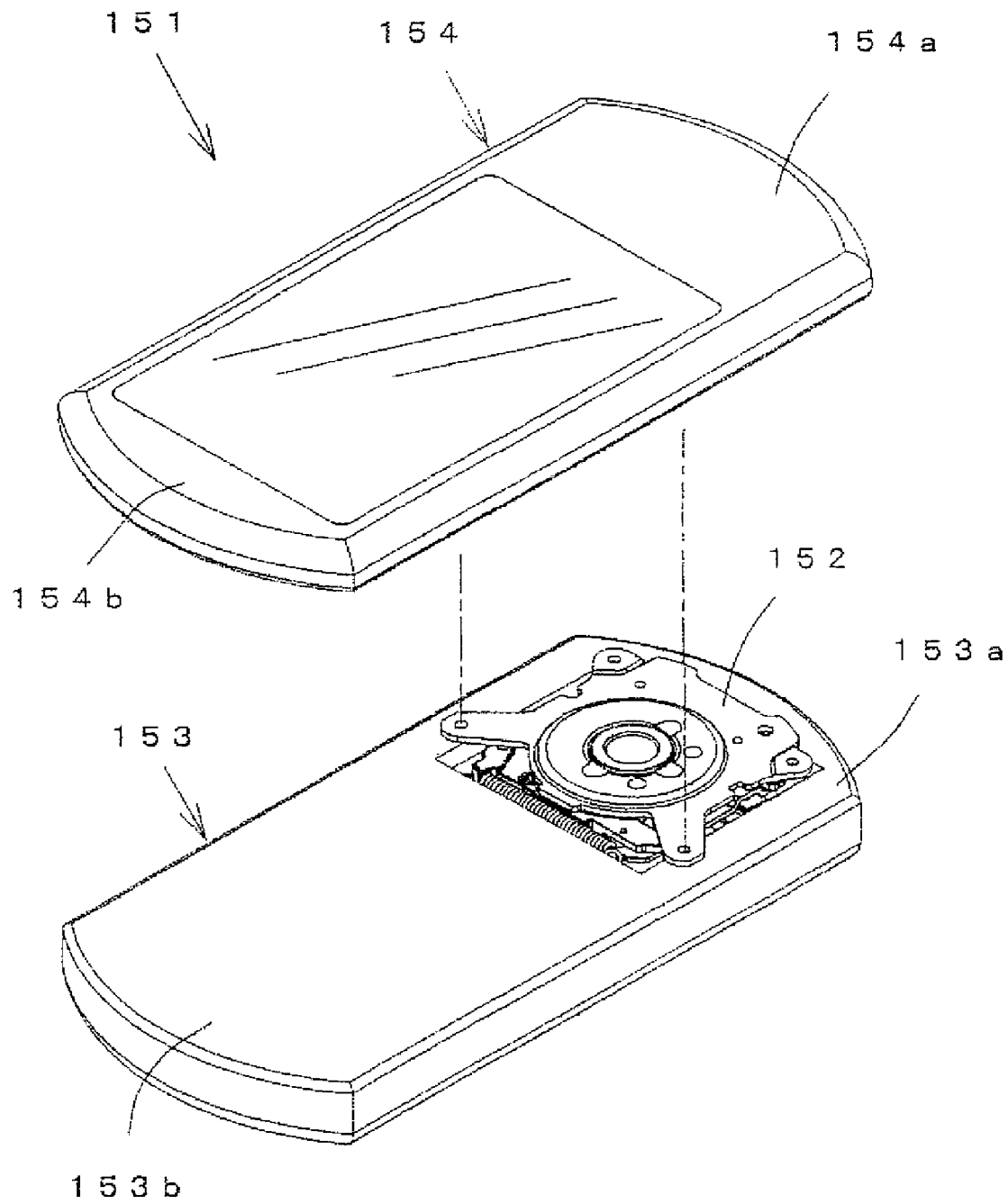
FIG. 15 is a perspective view showing a correspondence relationship between a main body and a cover of Embodiment 3 in relation to joining them at the closed position.
Figure 16:
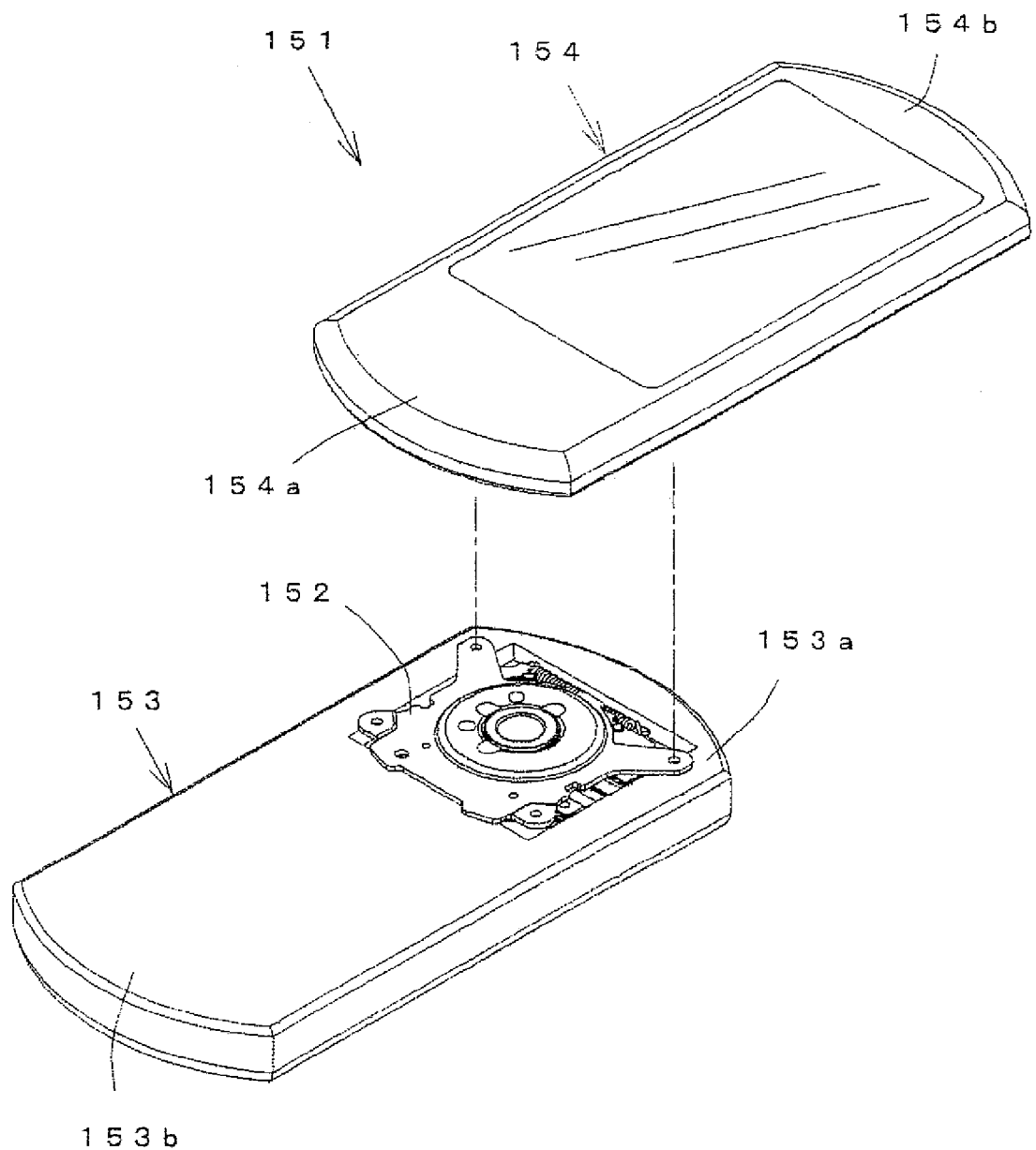
FIG. 16 is a perspective view showing a correspondence relationship between the main body and the cover of Embodiment 3 in relation to joining them at the open position.

FIG. 15 and FIG. 16 show Embodiment 3 of a rotational supporting mechanism 152 equipped in a horizontal rotation type cellular phone 151. The rotational supporting mechanism of Embodiment 3 and the already described rotational supporting mechanism 14 of Embodiment 1 have the same functions except that a swing-preventing function of the cover is improved and that a tilting guide function of the slider is improved. Therefore, only the different portions will be described.

The rotational supporting mechanism 152 is attached to a position of vertically joining a main body 153 and a cover 154 that are opposite to each other in a manner so as to axially support them in a direction in which they are superposed. The axially supporting position of the rotational supporting mechanism 152 is provided on a side in which basal end portions 153a, 154b of the main body 153 and the cover 154 are located, which corresponds to one longitudinal end side portion of the superposed main body 153 and cover 154 at the closed position. Therefore, when the cover 154 is turned and rotated 180 degrees from the closed position to the open position using the rotational supporting mechanism 152 as a rotational fulcrum, both of tip end portions 153b, 154b of the main body 153 and the cover 154 are in a state in which they are longitudinally extended to be at the farthest distance, so that an upper surface of the main body 153 is exposed.

When the cover 154 is at the open position, because the cover is turned 180 degrees, and the length of the main body 153 and the cover 154 is extended straight completely, the cover 154 is apt to be in the most unstable state. Therefore, the rotational supporting mechanism 152 is equipped with a swing preventing function in order for the cover 154 not to be supported unstably even slightly.

Figure 17:
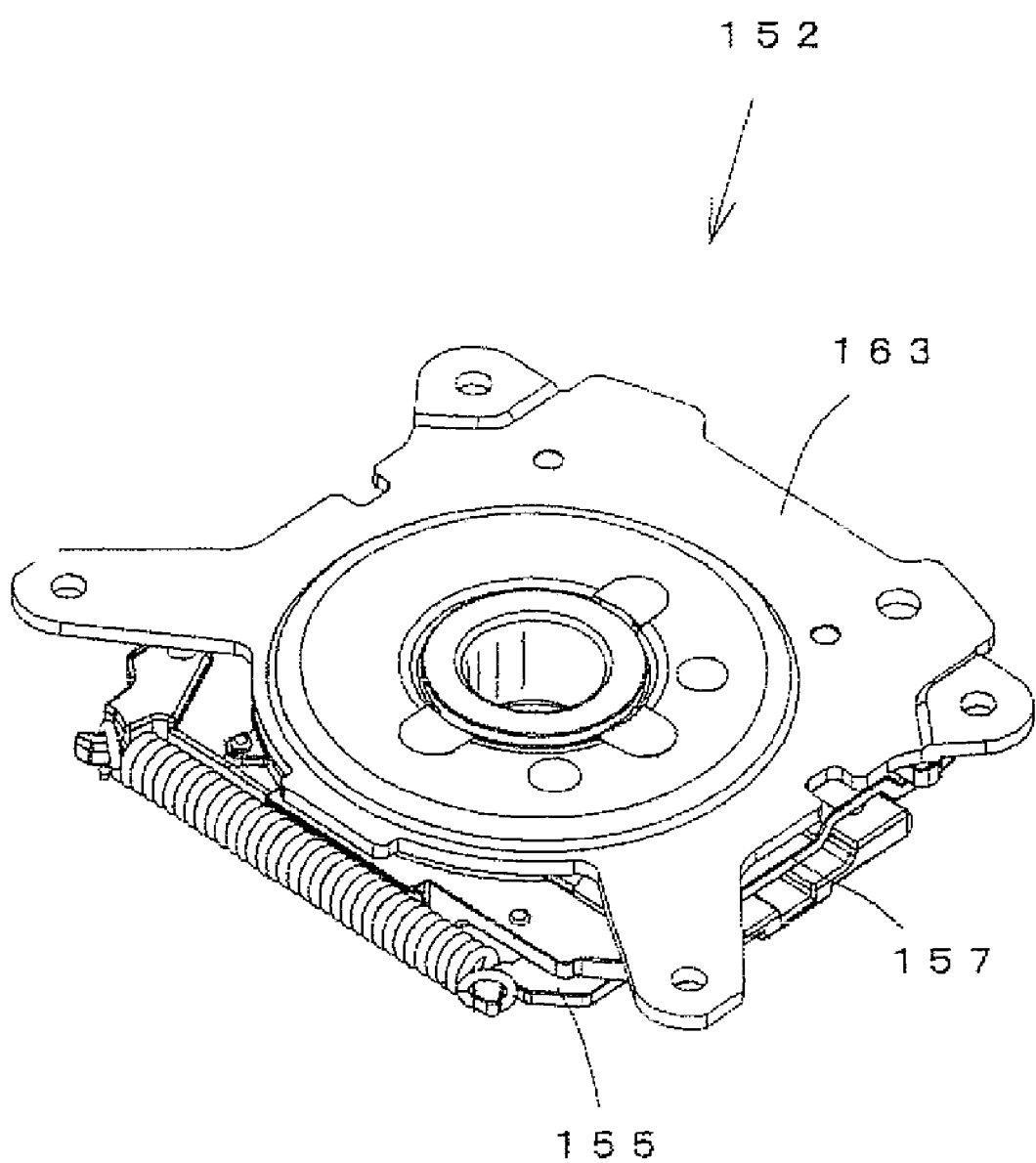
FIG. 17 is a perspective view, in enlargement, of essential portions showing a rotational supporting mechanism of Embodiment 3.
Figure 18:
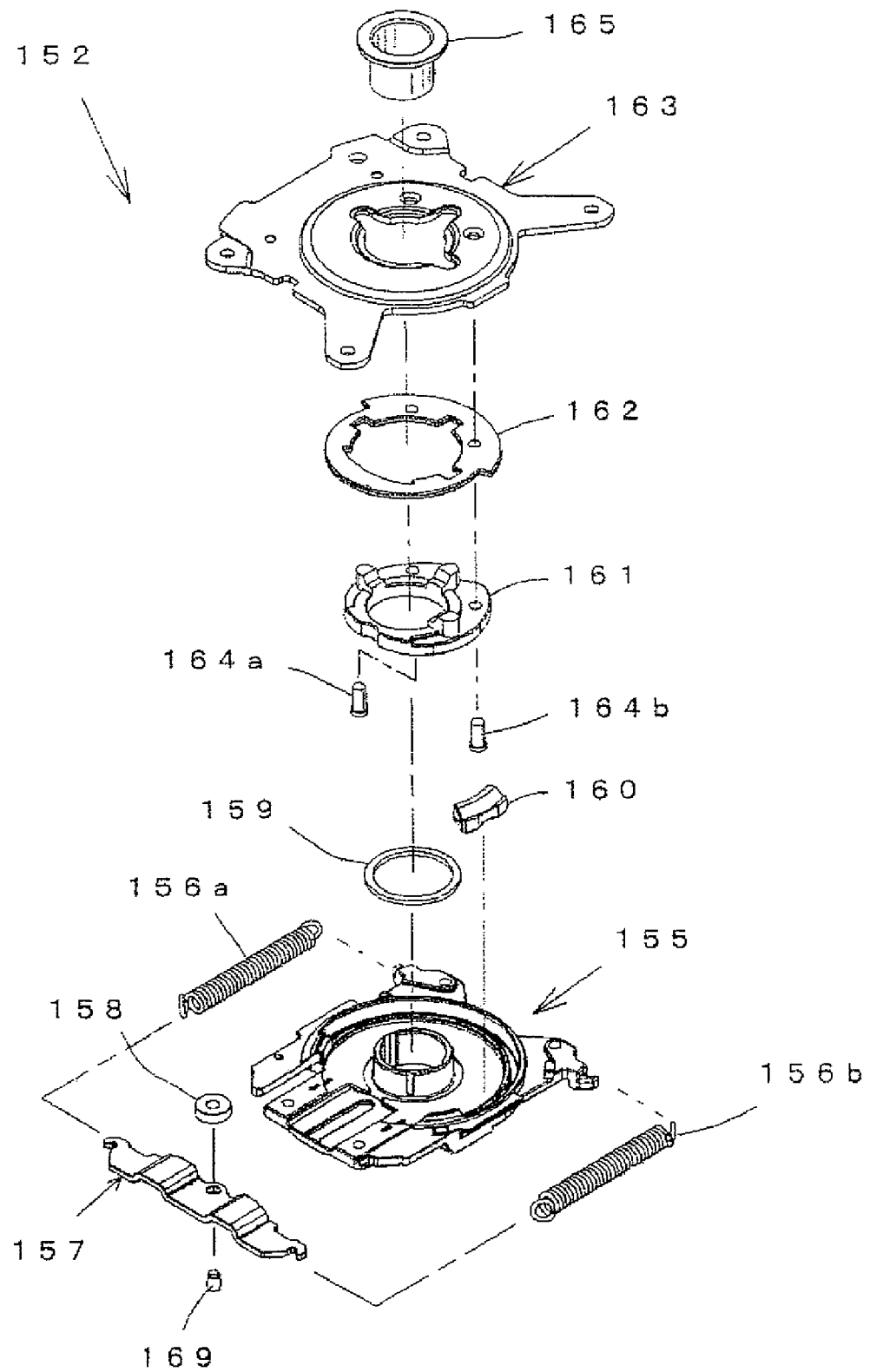
FIG. 18 is an exploded perspective view showing the rotational supporting mechanism of Embodiment 3.

As shown in FIGS. 17 and 18, the constitution of the rotational supporting mechanism 152 is such that, on an upper surface of a base 155, there are mounted parallel springs 156a, 156b, a slider 157, a pressing roller 158, an elastic ring 159, an interlocking piece 160, an eccentric cam 161, a rotation disc 162, and a plate 163. The rotational supporting mechanism 152 is assembled as follows. The eccentric cam 161, the rotation disc 162 and the plate 163, which constitute a rotational main part, are integrally joined in a manner so as to be vertically superposed with respective joining pins 164a, 164b, and the rotational main part is then rotatably fixed to the base 155 in a caulking manner using a caulking tube 165.

Next, swing preventing portions 166 of the rotational supporting mechanism 152 (FIG. 19) will be described. The swing preventing portions 166 are small bosses P1, P2, B1-B4, which are protrusively provided on both opposite surfaces in the direction of superposition of the base 155 and the plate 163 in a state in which the bosses P1, P2 and the bosses B1-B4 are butted against each other.

In the one-side plate 163 shown in FIG. 19(A), in which its lower surface is shown upward, a first boss P1 and a second boss P2 are dotted in a manner such that their radial distances from an axis 163a, around which is open at a central portion of the plate 163, are different as well as not present concentrically and that they are located at positions of a basal end portion of the plate corresponding to the side of the basal end portion 154a of the cover 154.

At this time, the first boss P1 on the side of the plate 163 is set in a manner so as to have a first distance L1 having a long distance from the axis 163a, while the second boss P2 is set in a manner so as to have a second distance L2 having a short distance from the axis 163a.

In the other-side base 155 shown in FIG. 19(B), a first boss B1 and a second boss B2 are dotted in a manner such that their radial distances from an axis 155a, around which is open at a central portion of the base 155, are different as well as not present concentrically and that they are located at positions of a basal end portion of the base corresponding to the side of the basal end portion 153a of the main body 153. On the other hand, third and fourth bosses B3 and B4 are dotted also at positions of a tip end portion of the base corresponding to the side of the tip end portion 153b of the main body 153, rotated 180 degrees from the positions of the first and second bosses B1 and B2. The third and fourth bosses B3, B4 and the first and second bosses B1, B2 are in symmetrical relation, respectively.

Also in this case, on the side of the base 155, the first boss B1 and the third boss B3 are set in a manner so as to have a first distance L1 having a long distance from the axis 155a, while the second boss B2 and the forth boss B4 are set in a manner so as to have a second distance L2 having a short distance from the axis 155a.

In this case, by dotting a plurality of butting positions of the bosses that are vertically opposite, the bosses are brought into contact with each other, so that the contact stability between the upper plate 163 and the lower base 155 is improved. For example, when the cover 154 is at the closed position, in the opposite surfaces of the plate 163 and the base 155, the first bosses P1, B1 and the second bosses P2, B2, which vertically protrude, are brought into point contact with each other. Thus, there is no room for the occurrence of vertical staggering between the corresponding upper plate 163 and lower base 155, which makes it possible to eliminate staggering of the cover 154 in the direction of superposition.

Furthermore, when this cover 154 at the closed position is rotated 180 degrees to be at the open position, in both of the opposite surfaces, where the base 155 on the main body side and the plate 163 on the cover side are opposed to each other, the first and second bosses P1, P2 protruding on the side of the tip end portion of the 180-degree rotated plate 163 are opposed to the third and fourth bosses B3, B4 protruding on the side of the tip end portion of the base 155, respectively, in a state in which they are butted against each other.

In this manner, the bosses on both sides can be brought into contact with each other at the respective positions in which the cover 154 is rotated 180 degrees to be opened and closed. Therefore, only by peripherally contacting the bosses on both sides, which protrude in the direction of superposition, the occurrence factor for staggering between the upper and lower opposite surfaces is eliminated, and the staggering of the cover is completely eliminated. This makes it possible to obtain a sense of stable opening and closing operations.

The positions of the bosses P1, P2, B1-B4 that are butted against each other are dotted at different positions on each of the sides of the plate 163 and the base 155, in a manner such that they are not present concentrically. Thereby, the bosses P1, P2, B1-B4 at the butting positions are not present concentrically. Thus, even if a rotational operation of the cover 154 is implemented, it is possible to avoid interference among the bosses P1, P2, B1-B4, because no other bosses are present in their rotational direction, so that a smooth rotation of the cover 154 is secured.

Incidentally, when the cover 154 is at the closed position, an initial rotational force is imparted to the cover 154 manually so that it is rotated to the open position. Thereafter, a pressing force of the parallel springs 156a, 156b works and performs a rotational operation. Therefore, the bosses are in a contact state in which some slippage is allowed. However, when the cover is at the open position, a pressing force of the parallel springs 156a, 156b is reduced, and the release torque is extremely reduced. Therefore, it is suitable that the butting height of the bosses is set lower at the open position than that at the closed position.

Figure 20:
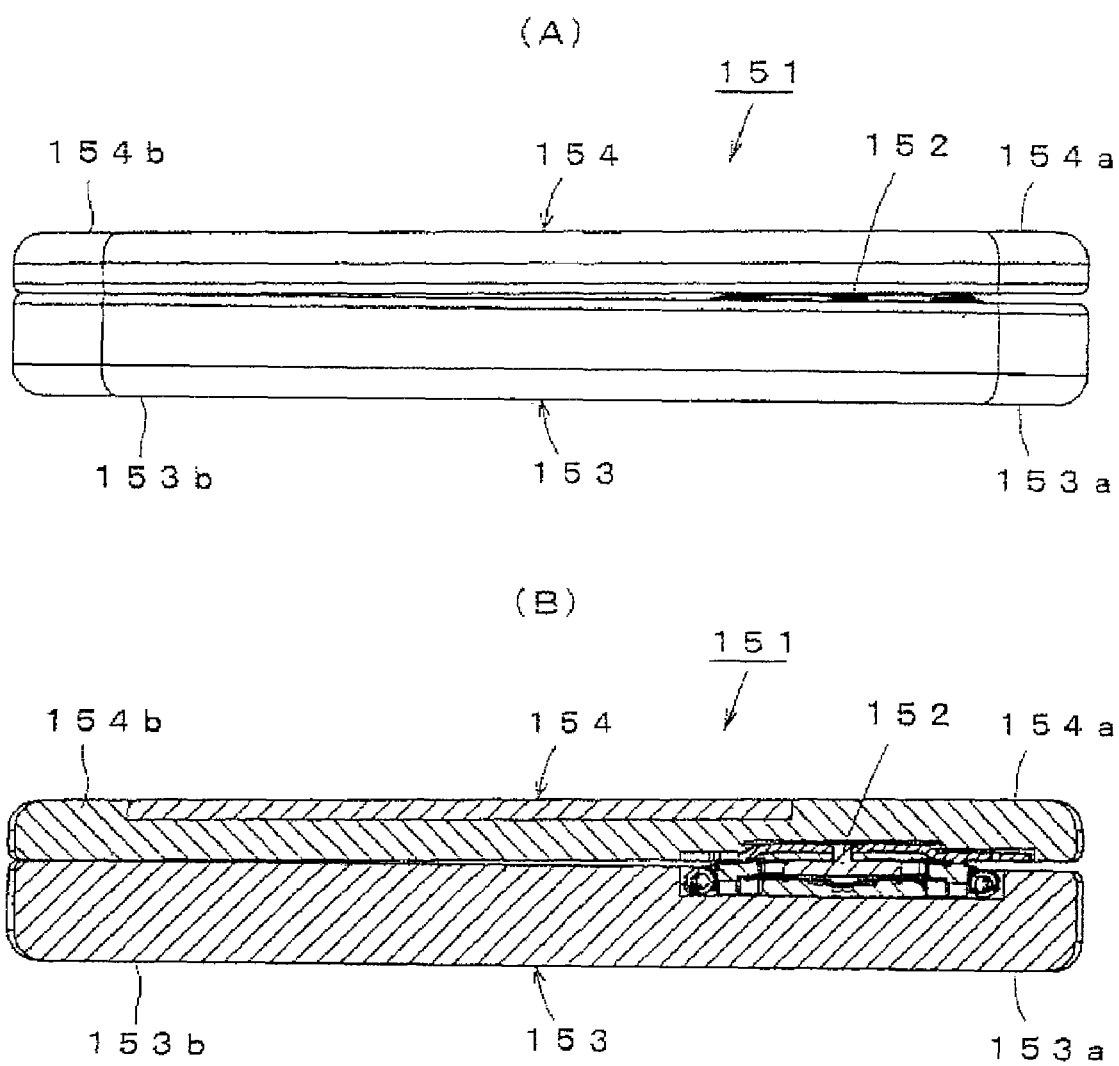
FIG. 20 represents a side view and a vertical cross section showing the swing preventing structure of the cover at the closed position in Embodiment 3.
Figure 21:
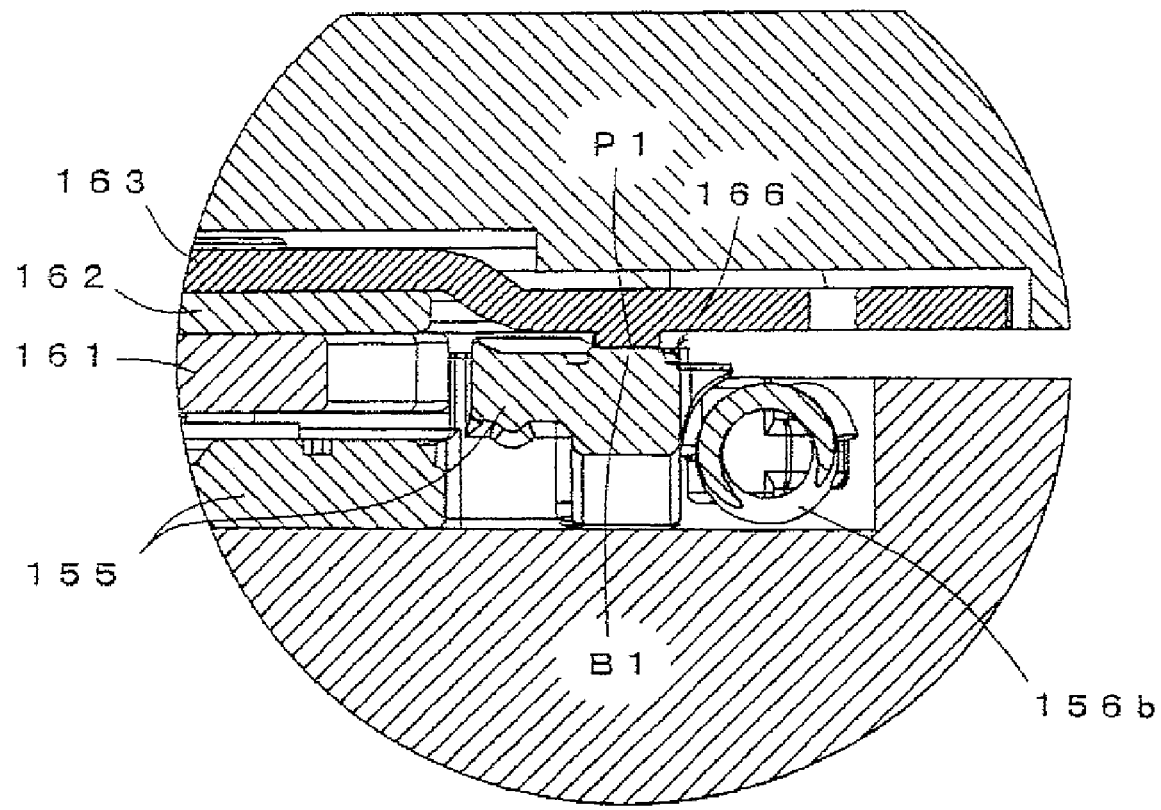
FIG. 21 is a vertical cross section, in enlargement, of essential portions showing a butted state of the bosses of Embodiment 3.

At the closed position in which the main body 153 and the cover 154 are superposed to be closed, as shown in FIGS. 20 and 21, the bosses P1, P2, B1, B2 are vertically opposed to each other on the side of the basal end portions 153a, 154a. Therefore, using the axially supporting portion as a tilting supporting point, a pressing force is increasingly applied on the side of the tip end portion 154b of the cover in the direction of superposition, so that it can be tilted. Accordingly, the side of the tip end portion 154b of the cover is in a state in which it is tilted to the side of the tip end portion 153b of the main body and in press-contact therewith, so that the staggering in the direction of superposition when the cover 154 is closed is completely eliminated.

When an opening operation of the cover 154 is implemented, the upper and lower bosses P1, P2, B1-B4 are in contact with each other, and there is no room for the occurrence of staggering. Therefore, the staggering is completely eliminated.

Furthermore, between the opposite upper and lower surfaces of the plate 163 attached to the cover 154 and the base 155 attached to the main body 153, the elastic ring 159 is interposed so as to serve as a role of absorbing the vertical fluctuation. The elastic ring 159, which is made of rubber, metal or the like, may be any material as long as it has elasticity in the vertical direction. Interposition of the elastic ring 159 makes it possible to further enhance the effect of improving the contact stability of the cover 154 and suppressing the staggering of the cover.

Next, an inclined guide function of the slider 157 will be described.

When the slider 157 is allowed to slide in a sliding direction, the slider 157 and the base 155 scrape against each other to be worn away by the movement of the slider 157, resulting in the occurrence of a gap between them. Due to the occurrence of the gap, the slider 157 is liable to result in an unstable sliding operation that it slides in a loosened manner in its widthwise direction. Therefore, for the slider 157, inclined guide portions 167 and a central sliding guide portion 168 in order to secure a stable sliding operation.

The inclined guide portion 167 is formed by inclining both of the base 155 and the slider 157 so that they are in contact with each other, thereby allowing the inclined guide portion 167 to have an inclined guide function. As shown in FIG. 22(A), lower trapezoidal guide surfaces 169a, 169b having a trapezoidal shape in cross section and engagement protruding pieces 170a, 170b are provided on an upper surface of the base 155 on both sides in the widthwise direction of the slider. On the other hand, the laterally long slider 157, whose concave and convex portions are fitted to those of the guide surfaces 169a, 169b and so on, thereby being guided in a sliding manner, is provided with upper trapezoidal guide surfaces 171a, 171b having a trapezoidal shape in cross section as well as horizontal pieces 172a, 172b on both sides in the widthwise direction of the slider so that concave and convex portions of the slider 157 are in contact with those on the base in an inclined manner when they are superposed.

Then, the slider 157 is slidably attached to the base 155 by placing the upper trapezoidal surfaces 171a, 171b of the slider 157 on the lower trapezoidal guide surfaces 169a, 169b of the base 155 in a state in which the concave and the convex portions of the slider 157 are in contact with those of the base 155 up and down.

Thereby, as shown in FIG. 22(B), the slider 157, which is urged to the base 155 by the parallel springs 156a, 156b, is pressed to the axis side, and guided in a sliding manner so as to go back and forth freely. At this time, the opposite trapezoidal guide surfaces 169a, 169b; and 171a, 171b are in contact with each other in an inclined manner on both sides in the widthwise direction of the slider. Further, the horizontal pieces 172a, 172b on both sides of the slider 157 are slidably supported by the engagement protruding pieces 170a, 170b.

In particular, since the contact guide portions of the slider 157 with those of the base 155 are opposed to each other in an inclined manner, the contact guide function in stereoscopic directions is obtained, staggering in the widthwise direction of the slider is eliminated, and a stable sliding guide operation is obtained. Furthermore, since the slider 157 is guided in an inclined manner on both sides in the widthwise direction of the slider, a uniform sliding guide operation is obtained.

The central sliding guide portion 168 guides the base 155 and the slider 157 in a sliding manner at a central portion in the widthwise direction of the slider. As shown in FIG. 23(A), the pressing roller 158 for making a smooth contact with the eccentric cam 161 is axially supported in a manner so as to be freely rotatable at a central portion on an upper surface in the widthwise direction of the slider. As shown in FIG. 23(B) in which the slider 157 is seen from its reverse, a lower end portion of a roller axis 173 that axially supports the pressing roller 158 at a central portion on a lower surface in the widthwise direction of the slider 157 is protrusively provided for use as a sliding guide. That is, the lower end portion of the roller axis 173 is fitted into a sliding guide groove 174 formed in the upper surface of the base 155, which extends in the sliding direction, so as to guide the slider 157 in a sliding manner using the roller axis 173 at the central portion of the slider 157 as a guide axis for sliding.

Figure 24:
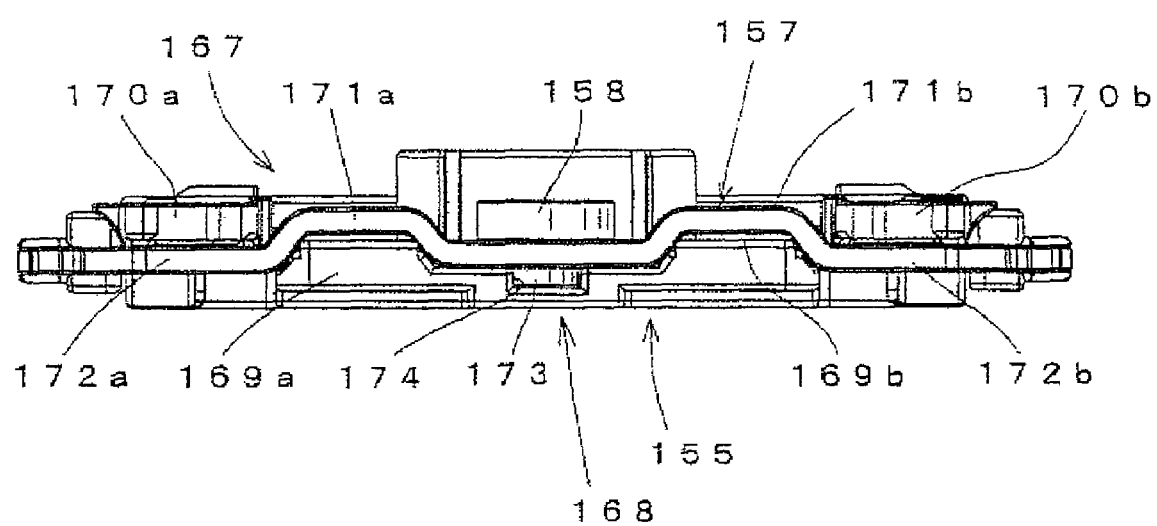
FIG. 24 is an elevation view showing a sliding state of the slider of Embodiment 3.
Figure 27:
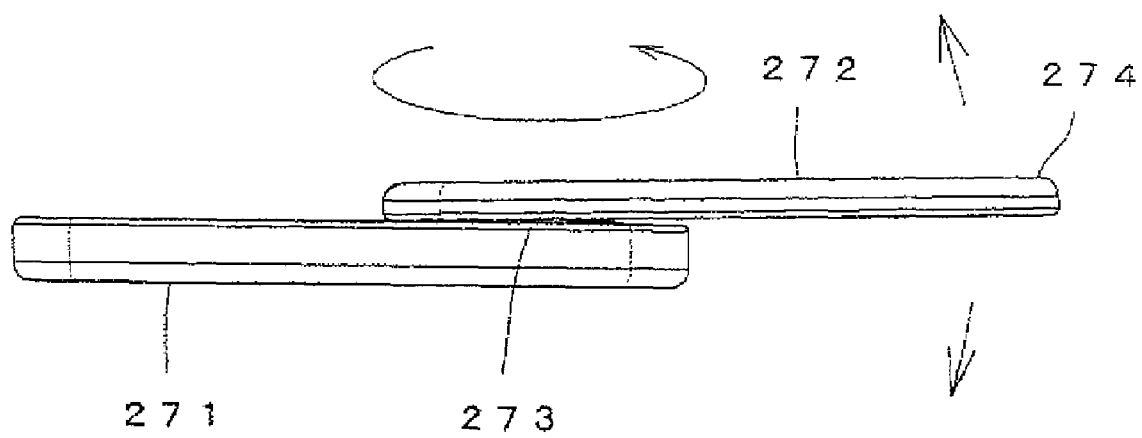
FIG. 27 is a side view showing a staggering state of a cover of the conventional cellular phone.

Therefore, the sliding guide function of three portions in total, namely the inclined guide portion 167 on both sides and the central sliding guide portion 168 are allowed to act simultaneously, whereby the slider 157 is allowed to perform a smooth sliding operation in the pressing direction as shown in FIG. 22(B) and FIG. 24. In particular, even if the contact portions between the slider 157 and the base 155 are worn away with the use for a long time, the contact in the inclined direction is secured and therefore, staggering does not occur in a sliding operation, thus making it possible to secure a stable sliding operation for a long time.

When the cellular phone 151 equipped with the thus constituted rotational supporting mechanism 152 is used, at the closed position in which the main body 153 and the cover 154 are superposed as such, the opposite bosses P1, P2; B1, B2 serving as the swing preventing portions 166 are in a state in which they are butted against each other. Therefore, the swing preventing function by these bosses P1, P2; B1, B2 works, so that the cover 154 is supported in a state in which even slight staggering is eliminated.

Furthermore, when the cover 154 is rotated 180 degrees in the planar direction from this closed position to perform an opening operation, during the opening operation or after completion of the opening operation, even if a pressing force in the direction of superposition is applied to the axially supporting portion of the cover 154, for example, unstable staggering of the cover 154 is eliminated by the point contact effect of the bosses as the swing preventing portions 166. Additionally, because the sliding function of the slider 157 that moves in a sliding manner when the cover 154 is rotated is enhanced, it is possible to obtain a sense of stable opening and closing operations.

Embodiment 4

Next, the arrangement of bosses constituting swing preventing portions of a rotational supporting mechanism of Embodiment of 4 will be described.

In FIG. 25, new bosses B3, B5, B6 are provided in addition to the bosses P1, P2, B1-B4 to further improve the contact stability between the main body and the cover. Thus, the same constitutions as those of Embodiment 3 are denoted by the same numerals, and descriptions thereof are omitted.

In the one-side plate 251 shown in FIG. 25(A), in addition to the bosses P1, P2, a third boss P3 is protrusively formed at a central position on a tip end side portion of the plate, with an axis 251a as the center. Therefore, on the other-side base 252 shown in FIG. 25(B) corresponding to the third boss B3, in addition to the bosses B1-B4, a fifth boss B5 is protrusively formed at a central position on a tip end side portion of the base, with an axis 252a as the center, which corresponds to the closed position of the cover, while a sixth boss B6 is protrusively formed at a central position on a basal end side portion of the base, which corresponds to the open position of the cover.

At this time, in the third boss P3 on the side of the plate 251, the distance from the axis 251a is reduced in a manner so as to be the shortest, and set to L3, different from the first and second distances L1, L2. Similarly, dotted positions of the fifth and sixth bosses B5, B6 are set in a manner so as to have the shortest distance L3 from the axis 252a, which is different from the first and second distances L1, L2.

In this manner, by not only providing the bosses P1, P2, B1, B2, B6 on the basal end side portion, but also by providing the bosses P3, B3-5 on the tip end side portion, with the axis portion 251a, 252a as the center, the bosses support the circumference around the axis by three-point support, thus making it possible to enhance the contact stability.

With regard to the correspondence of the constitution of this invention to that of the above embodiments, a cam surface of the invention corresponds to the outer peripheral surface 19a of the embodiments.

Similarly hereinbelow, a portion corresponding to a portion corresponding to the closed position corresponds to the recess 31 corresponding to the closed position, while a portion corresponding to the open position corresponds to the recess 32 corresponding to the open position. A pressing means corresponds to the parallel springs 16a, 16b, the slider 17, 157, the pressing roller 18, 143, 158, the pressing spring 142, and the tilt lever 144. A control means corresponds to the push/turn piece 35 of the rotation disc 20, the interlocking piece 21, 160, the left-handed rotational stopper 37, and the right-handed rotational stopper 38. An elastic member corresponds to the parallel springs 16a, 16b, 156a, 156b, and the pressing spring 142. A following member corresponds to the pressing roller 18, 143, 158. A pressing piece corresponds to the slider 17, 157 and the tilt lever 144. A position control portion corresponds to the left-handed rotational stopper 37 and the right-handed rotational stopper 38.

The invention can be applied based on the technical idea shown in the claims, and it should not be construed to be limited to only the constitution of the examples.

For example, in the above examples, the base 15 of the rotational supporting mechanism 14 is attached to the main body 12, while the plate 22 is attached to the cover 13. Alternatively, the base 15 may also be oppositely placed by attaching it to the cover 13 and attaching the plate 22 to the body 12. In the above embodiments, the symmetrical eccentric cam 19 was used, but it is not limited thereto. Using an asymmetric eccentric cam or changing the surface resistance of an eccentric cam between left and right outer peripheral surfaces makes it possible to change the left-handed rotational speed and the right-handed rotational speed during an opening operation.

Furthermore, the pressing roller 18, 143, 158 is so constructed that the pressing force of the spring(s) is imparted to the eccentric cam 19, 161 via the slider, 17, 157 or the tilt lever 144. The pressing roller may also be so constructed that the slider 17, 157 or the tilt lever 144 is omitted to reduce the number of components. Also, the rotation disc 20, 162 and the plate 22, 163 may be integrally made from the beginning. In this case, one component can be omitted.

INDUSTRIAL APPLICABILITY

The rotational supporting mechanism of the present invention can be applied not only to the above cellular phones but also to other mobile terminals such as electronic notebooks and portable music players.

What is claimed is:

1. A rotational supporting mechanism supporting a main body and a cover so that the main body and the cover are superposed when in a closed position, and, from the closed position, the cover is rotated 180 degrees in a planar direction in which the cover and the main body are superposed and stopped at a 180-degree rotational position when in an open position, the rotational supporting mechanism comprising:

an eccentric cam rotating eccentrically about a fixed rotation axis with respect to said planar direction, said eccentric cam having a peripheral cam surface having a recessed portion corresponding to the closed position at one rotational position comprising a maximum eccentricity of the cam surface at a maximum radius from the axis, and a recessed portion corresponding to the open position at another position comprising a minimum eccentricity of the cam surface at a minimum radius from the axis the positions being 180 degrees opposite to each other through the axis of the eccentric cam; and a pressing means configured to press the cam surface of the eccentric cam by setting a pressing direction to the same direction as that of a line connecting both of the portion corresponding to the closed position and the portion corresponding to the open position when the cover is in the closed position, wherein the pressing means applies a spring biased pressing load to the eccentric cam in the pressing direction and applies a pressing force to prevent the eccentric cam from rotating as the cover rotates between the closed position and the open position;

wherein the pressing load applied to the eccentric cam and the pressing force to prevent the eccentric cam from rotating are increased to stop rotational movement of the eccentric cam when the pressing means engages the recessed portion corresponding to the closed position on the cam surface, wherein the pressing load applied to the eccentric cam is reduced as the pressing means approaches a side of the recessed portion corresponding to the open position, and the pressing force to prevent the eccentric cam from rotating is increased to stop the rotational movement of the eccentric cam when the pressing means engages the recess portion corresponding to the open position, wherein one of the eccentric cam and pressing means is attached to the main body, while the other of the eccentric cam and pressing means is attached to the cover so that the cover is rotationally supported.

2. The rotational supporting mechanism according to claim 1, wherein, when the portion corresponding to the open position on the cam surface of the eccentric cam engages the pressing means, a control means for controlling excessive rotation beyond the position corresponding to the open position in the same direction as that in which the eccentric cam is rotated 180 degrees to the open direction is provided.

3. The rotational supporting mechanism according to claim 2, wherein
the control means comprises:
a rotation disc that rotates left or right in the planar direction;
an interlocking piece tat rotates with the rotation disc in the same rotational direction by receiving the rotational force of the rotation disc; and
position control portions configured to prevent the interlocking piece from rotating beyond the portion corresponding to the open position of the eccentric cam.

4. The rotational supporting mechanism according to claim 1, wherein the eccentric cam has a recess corresponding to the closed position at one point with maximum eccentricity on the eccentrically rotating cam surface, to which a protruding portion of the pressing means engages, and has a recess corresponding to the open position at one point with minimum eccentricity, to which the protruding portion of the pressing means engages.

5. The rotational supporting mechanism according to claim 1, wherein
the pressing means comprises:
an elastic member configured to press the cam surface in the pressing direction; and
a following member moving back and forth in the pressing direction, based on the pressing force that the following member receives from the elastic member, to follow along the cam surface of the eccentric cam.

6. The rotational supporting mechanism according to claim 1, wherein
the pressing means comprises:
a pressing spring configured to press the cam surface in the pressing direction;
a pressing piece moving back and forth in the pressing direction by receiving the pressing force of the pressing spring; and
a pressing roller axially supported on the pressing piece in a manner so as to be freely rotatable, and pressing against the cam surface of the eccentric cam integrally with the pressing piece by receiving the pressing force of the pressing spring.

7. The rotational supporting mechanism according to claim 1, wherein swing preventing portions for preventing the cover from staggering are provided at opposite and superposed surfaces of the main body and the cover in proximity of an axially supporting portion that joins both of the main body and the cover in the direction rotation to axially support the main body and the cover.

8. The rotational supporting mechanism according to claim 7, wherein
the swing preventing portion comprises a plurality of bosses formed at the surface of the cover and the main body,
wherein, when the cover is rotated 180 degrees to be located at the open position from the closed position, the bosses are butted against each other.

9. The rotational supporting mechanism according to claim 8, wherein
the plurality of bosses are formed at ends of the cover and the main body, which are closer to the axis.

10. The rotational supporting mechanism according to claim 8, wherein
the plurality of bosses are formed in scattered locations, and
wherein the plurality of bosses have different radial distances from the axis of the eccentric cam so as not to be present concentrically relative to the axis.

11. The rotational supporting mechanism according to claim 7, wherein
the swing preventing portion comprises a plurality of bosses formed at the surfaces of the cover and the main body,
wherein the plurality of bosses are fonned at scattered locations, and
wherein the plurality of bosses have different radial distances from the axis of the eccentric cam so as not to be present concentrically relative to the axis.

12. The rotational supporting mechanism according to claim 11, wherein
the plurality of bosses are formed at ends of the cover and the main body that are closer to the axis.

13. The rotational supporting mechanism according to claim 1, wherein
the pressing means comprises:
a base disposed on an upper surface of the main body;
an inclined guide portion provided on both sides of the pressing means in a widthwise direction, comprising a pressing piece configured to be pressed against the eccentric cam and configured to be guided in a sliding manner so that the pressing piece goes back and forth freely,
wherein the pressing piece and the base are inclined from each other where the pressing piece and the base contact.

14. The rotational supporting mechanism according to claim 13, wherein the pressing means has the inclined guide portion on both sides of the pressing means in the widthwise direction of the pressing piece, and a central sliding guide portion formed on an axis portion provided at a central portion in the widthwise direction of the pressing piece and a sliding guide groove formed on the base, a concave portion of which is fitted to the axis portion along the sliding direction.

15. A mobile tenninal comprising a rotational supporting mechanism of claim 1.

* * * * *